US011451256B1

(12) United States Patent
Beaulieu

(10) Patent No.: US 11,451,256 B1
(45) Date of Patent: Sep. 20, 2022

(54) PROTECTIVE AND FUNCTIONAL LAYERS FOR DISPLAY SCREENS

(71) Applicant: Paul Beaulieu, Bow, NH (US)

(72) Inventor: Paul Beaulieu, Bow, NH (US)

( * ) Notice: Subject to any disclaimer, the term of this patent is extended or adjusted under 35 U.S.C. 154(b) by 0 days.

(21) Appl. No.: 15/369,472

(22) Filed: Dec. 5, 2016

Related U.S. Application Data

(60) Provisional application No. 62/386,504, filed on Dec. 3, 2015.

(51) Int. Cl.
*H04B 1/3888* (2015.01)
*H04M 1/02* (2006.01)

(52) U.S. Cl.
CPC ........ *H04B 1/3888* (2013.01); *H04M 1/0266* (2013.01)

(58) Field of Classification Search
CPC ............... B32B 2457/20; B32B 17/06; B32B 2037/243; B32B 2038/045; B32B 2307/412; B32B 27/00; B32B 27/08; B32B 27/32; B32B 27/34; B32B 27/36; B32B 37/0076; B32B 37/1292; B32B 37/24; B32B 38/0004; B32B 38/04; B32B 38/10; B32B 3/00; G02F 1/133305; G02F 2001/133331; G02F 1/1333; G02F 1/133308; G02F 1/1339; G02F 1/167; G02F 2001/133302; G02F 2201/50; G02F 2202/28; H01L 2251/5338; H01L 51/5246; H01L 51/5253; H01L 27/323; H01L 27/3251; H01L 51/5237; H01L 51/524; H01L 51/5281
See application file for complete search history.

(56) References Cited

U.S. PATENT DOCUMENTS

| 7,957,524 | B2 | 6/2011 | Chipping |
| 9,292,128 | B1* | 3/2016 | Huang ................... G06F 1/1643 |
| 2004/0189191 | A1* | 9/2004 | Ohshita ............... H01L 51/5284 |
| | | | 313/504 |
| 2010/0270189 | A1 | 10/2010 | Pedersen, II et al. |
| 2011/0164372 | A1* | 7/2011 | McClure ............... G06F 1/1613 |
| | | | 361/679.26 |

(Continued)

FOREIGN PATENT DOCUMENTS

CN 203864115 U * 10/2014 ............. B32B 17/06

OTHER PUBLICATIONS

Applications of Sapphire Crystals, [online]. Shinkosha, [Retrieved on Mar. 29, 2017]. Retrieved from the Internet <URL: <http://shinkosha.com/scube_e/use.html>.

(Continued)

*Primary Examiner* — Golam Sorowar
(74) *Attorney, Agent, or Firm* — McCarter & English, LLP

(57) ABSTRACT

A set of protective layers configured to protect and enhance a display or interface of a device is provided. The layers may include layers of material to strengthen the respective device components to increase durability and reduce damage from impacts. When the layers are impacted by a foreign object, the force may be absorbed by the strengthened component or transferred to other areas of the device, rather than catastrophically damaging the display, encasement or interface of the device. Additionally, the use of functional layers is provided to enhance device performance and user experience. Related assemblies and methods are also provided.

13 Claims, 18 Drawing Sheets

(56) References Cited

U.S. PATENT DOCUMENTS

| | | | | |
|---|---|---|---|---|
| 2013/0142981 A1* | 6/2013 | Huang | ................ | C09J 7/30 |
| | | | | 428/41.8 |
| 2013/0294017 A1* | 11/2013 | Ota | ................ | H05K 5/062 |
| | | | | 361/679.01 |
| 2013/0342971 A1* | 12/2013 | Jacobs | ................ | H01L 51/5237 |
| | | | | 361/679.01 |
| 2014/0168864 A1* | 6/2014 | Lin | ................ | G02F 1/133308 |
| | | | | 361/679.01 |
| 2014/0204310 A1* | 7/2014 | Lee | ................ | G02F 1/133308 |
| | | | | 349/62 |
| 2015/0022081 A1* | 1/2015 | Li | ................ | H01Q 1/44 |
| | | | | 315/34 |
| 2015/0064422 A1* | 3/2015 | Choiniere | ................ | B32B 27/281 |
| | | | | 428/203 |
| 2015/0181059 A1* | 6/2015 | Hu | ................ | H04N 1/00347 |
| | | | | 358/509 |
| 2015/0323961 A1* | 11/2015 | Leonhard | ................ | H04B 1/3888 |
| | | | | 428/38 |
| 2016/0064130 A1* | 3/2016 | Eng | ................ | H01F 7/0252 |
| | | | | 335/229 |
| 2016/0309263 A1* | 10/2016 | Kanemaki | ................ | H04M 1/035 |
| 2016/0320463 A1* | 11/2016 | O'Neill | ................ | G01R 33/283 |
| 2016/0334843 A1* | 11/2016 | Uto | ................ | G02F 1/133385 |

OTHER PUBLICATIONS

Are AMOLED displays at risk of burn-in? [online]. Jan. 21, 2014, Alphr.com, [Retrieved on Mar. 29, 2017]. Retrieved from the Internet <URL:<http://www.alphr.com/realworld/386635/are-amoled-displays-at-risk-of-burn-in>.

Charging without Wires, [online]. Batteryuniversity.com, [Retrieved on Mar. 29, 2017]. Retrieved from the Internet <URL: <http://batteryuniversity.com/learn/article/charging_without_wires>.

Discharging at High and Low Temperatures [online]. Batteryuniversity.com, [Retrieved on Mar. 29, 2017]. Retrieved from the Internet <URL: http://batteryuniversity.com/learn/article/discharging_at_high_and_low_temperatures.

Effect of Temperature on the Aging rate of Li Ion Battery Operating above Room Temperature [online]. Aug. 6, 2015, nature.com, [Retrieved on Mar. 29, 2017]. Retrieved from the Internet <URL:www.nature.com/scientificreports.

Electric and Magnetic Fields and Health Outcomes [online]. Ilocis.org, [Retrieved on Mar. 29, 2017].Retrieved from the Internet <URL: http://www.ilocis.org/documents/chpt49e.htm.

Electric Car Charging 101—Types of Charging, Charging Networks, Apps, & More! [online], Sep. 10, 2015, Evobession.com, [Retrieved on Mar. 29, 2017]. Retrieved from the Internet <URL: http://evobsession.com/electric-car-charging-101-types-of-charging-apps-more/.

Jacoby et al., "Predicted and measured EMI shielding effectiveness of a metallic mesh coating on a sapphire window over a broad frequency range" Research paper by Battelle Memorial Institute, vol. 7302, p. 7302OX, 2009.

Smartphones Feel the Heat [online]. Jul. 15, 2015, eetimes.com [Retrieved on Mar. 29, 2017]. Retrieved from the Internet <URL: http://www.eetimes.com/.

The Physics of Wireless Charging [online]. Sep. 8, 2014, wired.com, [Retrieved on Mar. 29, 2017]. Retrieved from the Internet <URL:https://www.wired.com/2014/09/the-physics-of-wireless-charging/.

Thermal behavior and indirect life of large-area OLED lighting panels [online]. May 23, 2014, springeropen.com, [Retrieved on Mar. 29, 2017]. Retrieved from the Internet <URL: http://journalofsolidstatelighting.springeropen.com.

Thermal Conductivity of common Materials and Gases. [online]. Engineeringtoolbox.com, Retrieved on Mar. 29, 2017]. Retrieved from the Internet <URL:http://www.engineeringtoolbox.com/thermal-conductivity-d_429.html.

Wireless charging for Leaf, Volt and ELR? It's here . . . and it ain't cheap. [online]. Autoweek.com, Jul. 27, 2015, [Retrieved on Mar. 29, 2017]. Retrieved from the Internet <URL: http://autoweek.com/article/green-cars/nissan-leaf-and-chevy-volt-go-plugless.

U.S. Appl. No. 15/465,335, filed Mar. 21, 2017.

* cited by examiner

PROTECTIVE AND FUNCTIONAL LAYERS FOR DISPLAY SCREENS

RELATED APPLICATION

This application claims benefit of priority to U.S. Provisional Application No. 62/386,504 filed Dec. 3, 2015, the contents of which is hereby incorporated in its entirety.

BACKGROUND

Electronic devices, non-electronic devices, analytical instruments and sensors often employ a display to output graphics, text, and other visual information. The display is covered by a panel that protects the display from damage and contamination while allowing the visual communication of information from the devices to a user. In many devices the panel is formed from glass.

However, a glass panel may be damaged from hard or sharp objects. For example, dropping the device may cause a glass panel to shatter or crack. Similar issues may exist with other embodiments of substrates or display covers employed to protect a display.

SUMMARY

Embodiments of the present disclosure relate to protective layers and functional layers that may be attached to substrates or display covers, such as glass panels, to protect the glass panels from damage and improve the functionality of the device or improve the user experience. In some embodiments, the protective layer may improve one or more operational characteristics of the computing device. That is, the protective layer can increase battery life and extend operation of the computing device by improving heat dissipation from the device. The protective layers may include multiple layers. For example, the protective layers may include an outer layer and an outer edge layer. The outer layer may be sapphire, glass or other materials, as described in greater detail below. Likewise, there may be multiple functional layers, such as an electrically-conductive layer and an anti-reflective layer, for example.

The horizontal edges of the protective layers assembly may include flexible or rigid material and strengthening adhesives applied directly to the edges of the protective layers assembly. In this regard, the protective layers assembly may include material to absorb or deflect shock impacts to the edges and corners of the protective layers assembly. Thus, by providing strengthening layers and shock-absorbing or shock-deflecting materials to the edges of the protective layers, when the protective layers are subject to an edge or corner impact from a sharp or hard item, the force from the impact may be absorbed or deflected by the material on the edges. Accordingly, the impact may not catastrophically damage the protective layers or the substrate or device cover beneath the protective layers.

An adhesive layer may be employed to couple the protective layers to the substrate or display cover or to the device encasement. Related assemblies and methods are also provided.

Functional layers that improve specific functions of the device may be placed within the protective layers assembly or on the exterior of the assembly, depending on the particular functional material and the particular embodiment.

The use of an oleophobic layer for resisting oily substances, plus the use of luminescent paint and infrared ink on or in the protective layers assembly for security, identification and unique branding applications is also disclosed.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Figure 1:
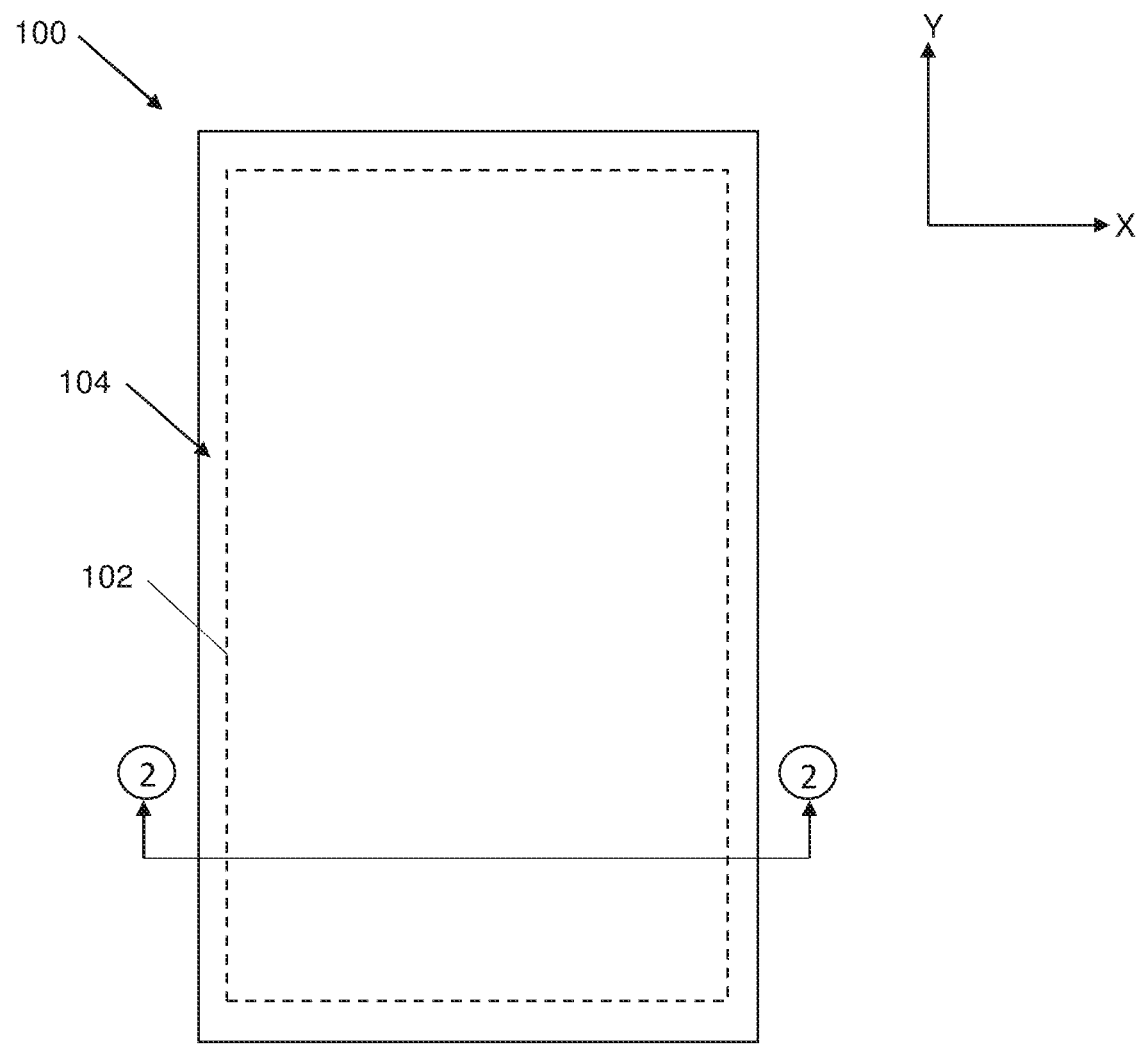
FIG. 1 illustrates a top view of an embodiment of a computing device including a display and a protective assembly according to an example embodiment of the present disclosure.

To-date, protective covers for computing devices, such as smartphones and tablets, have been developed by others and are currently available in the market. The intention of the existing available protective covers in the market is to provide improved scratch protection and to protect display panels from breakage in the event the device is dropped. In this regard, such conventional protective covers may include a hard layer material, such as tempered glass, chemically strengthened glass, soda lime glass, sapphire, hardened plastic and other materials, configured to resist shattering of the display panel it is intended to protect. These existing conventional protective covers may also be employed to protect other areas of the device housings or enclosures for electronic devices, screens, or sensors. However, such existing protective covers may not provide sufficient resistance to breakage and other damage in all circumstances. Furthermore, the existing protective covers often do not include functional layers to improve device functions. Accordingly, an improved protective cover for protecting displays and other substrates, and for improving encasements may be desirable.

Functional layers that improve device functionality and user experiences are also important. Modern devices, instruments and sensors often transmit and/or receive a variety of communication signals, electrical, magnetic and light waves and other forms of energy as part of their communications, display, power and image capturing systems. These can include, but are not limited to thermal energy, optical light, infrared light, radio frequency transmissions, electrical transmissions, ultrasonic transmissions and a variety of electromagnetic transmissions. It is important that devices, instruments and sensors, and their respective components, be optimized to achieve desirable transmission levels and related effects for each of the potential varieties of transmissions and receptions.

Accordingly, functional layers for improving transmission and reception levels and related effects for protective layers, display covers, device encasements and devices may be desirable.

Also, the use of luminescent paints and infrared inks for security applications and unique branding opportunities in and on the protective layers assembly provides additional functionality and improved user experiences to the protective layers assembly.

Representative applications of assemblies, apparatuses, and methods according to the presently described embodiments are provided in this section. These examples are being provided for the sole purpose of adding context and aiding in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described in detail below, the present disclosure relates to protective layers and functional layers configured to protect substrates or display covers and device enclosures from damage and improve device functionality and user experiences. The protective layer assembly described herein can be used to protect displays of computing devices, including computing devices having touch-sensitive screens, such as smartphones, mobile phones, tablets, e-readers (e.g., Kindle), laptops and the like. The protective layer assembly described herein may also be used to protect displays of other computing devices such as laptops without a touch sensitive display, virtual reality headsets, augmented reality headsets, wearable devices (e.g., smartwatches, fitness trackers, etc.) GPS units, music players, barcode scanners, signature capture devices, retail point of sale devices, industrial device displays, medical testing and measurement devices, and the like. The protective layer assembly described herein can not only be used to protect displays, but can also be used to protect input surfaces or interfaces, such as touch-screen interfaces, biometric input interfaces, and the like. Additionally, the protective layer assembly can be used to protect substrates, covers, encasing or enclosures for a variety of objects and devices, including sensors, cameras, and others.

It should be noted that the present description is generally provided in terms of protection of a substrate or display cover covering a display of a computing device or for improving particular functions of the computing device. However, the protective layers and functional layers employed herein may be employed with any substrate or device cover or encasement in accordance with embodiments of the disclosure. In this regard, the protective layers and functional layers may be employed with front, side, or back components for computing devices and non-computing devices, substrates or display covers or encasements protecting computer laptop or television displays, automotive windows, automotive dashboard and entertainment system components, battery charging components, "Internet of Things" sensors and communication system components, audio system components (including headphones), self-driving transportation system components, additive manufacturing equipment, eyewear, building windows, sensor windows, sensor casings or enclosures, motion-detector sensors, imaging sensor, camera covers, security and identification systems (such as fingerprint or biometric sensors or scanners), and any other embodiment of substrate or device covers or encasements.

As used herein, an edge or edges extend around the perimeter of a layer (e.g., outer layer, functional layer, and/or adhesive layer), and includes the side walls between a top surface and a bottom surface of the layer of the protective layer assembly described herein.

FIG. 1 illustrates an embodiment of a computing device 100. In an example embodiment, the computing device 100 may be a smartphone. In this regard, due to the portable nature of such a device, impact events may frequently occur due to mishandling by a user and accidental dropping of the device. As illustrated, the computing device 100 may include a display 102 configured to display one or more graphical images and a protective assembly 104 positioned thereon and configured to cover and protect the display.

Figure 2:
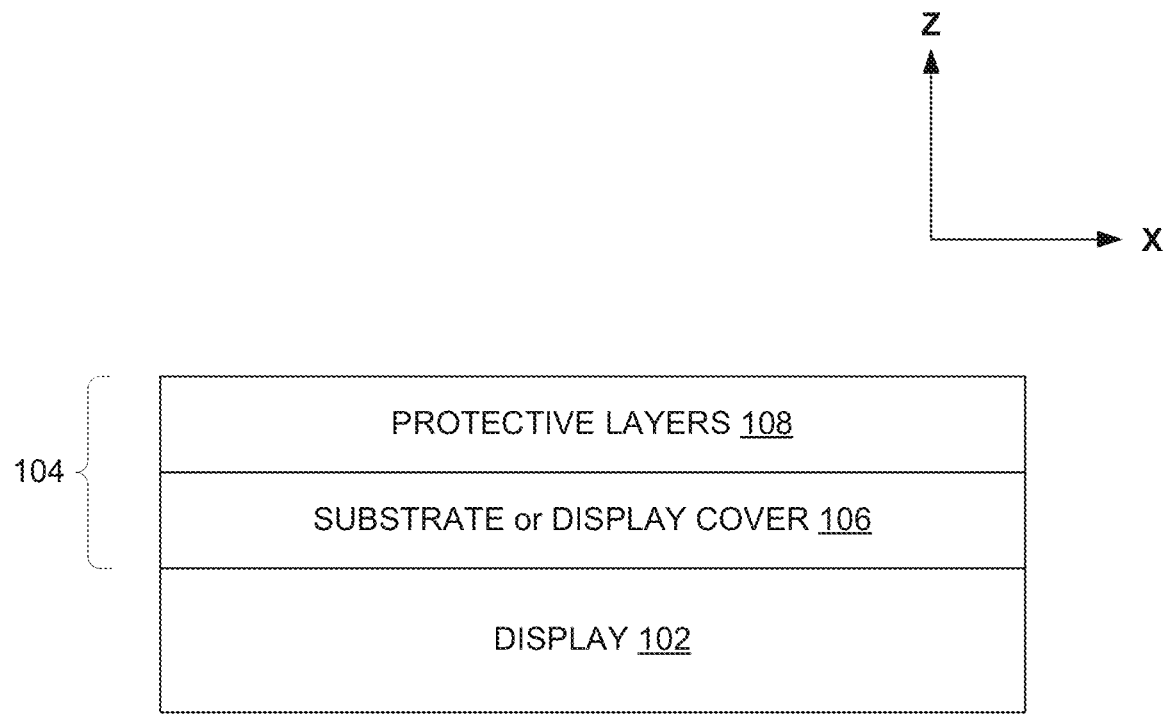
FIG. 2 illustrates a cross-sectional view through the computing device of FIG. 1 along line 2-2 according to an example embodiment of the present disclosure.

FIG. 2 schematically illustrates a cross-sectional view through the display 102 and the protective assembly 104 of the computing device 100 along line 2-2 from FIG. 1. As illustrated, the protective assembly 104 may include a substrate or display cover 106 and protective layers 108. In one embodiment the substrate or display cover 106 may comprise a glass panel. In some embodiments, a user couples the device display 102 to a substrate or display cover 106 to provide protection to the device display. The protective layers 108 may be applied to the substrate of display cover 106. In alternative embodiments, the protective layers 108 may be applied to the device display 102.

Use of a glass substrate or a glass display cover may be preferable in some embodiments due to the optical qualities of glass. Note, however, that although the present disclosure generally describes usage of such protective layers in conjunction with a glass substrate or display cover, the substrate or display cover may comprise various other substances in other embodiments (e.g., sapphire crystal, acrylic, plastic, other monocrystalline materials, polycrystalline materials, etc.). Accordingly, it should be understood that reference to a glass substrate or display cover is for example purposes only, and the substrate or display cover may comprise various other materials in accordance with embodiments of the present disclosure.

The protective layers 108 may be configured to protect the substrate or display cover 106. For example, the protective layers 108 may be configured to protect the substrate or display cover 106 from damage such as cracks and scratches resulting from contact with foreign objects. In this regard, some materials employed as the substrate or display cover 106, such as glass, may be relatively brittle and otherwise prone to damage when a hard and/or sharp object comes into contact with it. Sharp objects, as used herein, refers to objects defining a surface area approximately the size of a small pebble, or approximately 1 square millimeter. In some embodiments each of the one or more layers of the protective layers 108 may be at least partially transparent, particularly for applications requiring some level of visual transparency. Accordingly, the protective layers 108 may be employed in conjunction with the display 102, without substantially detrimentally affecting the usability thereof.

Figure 3:
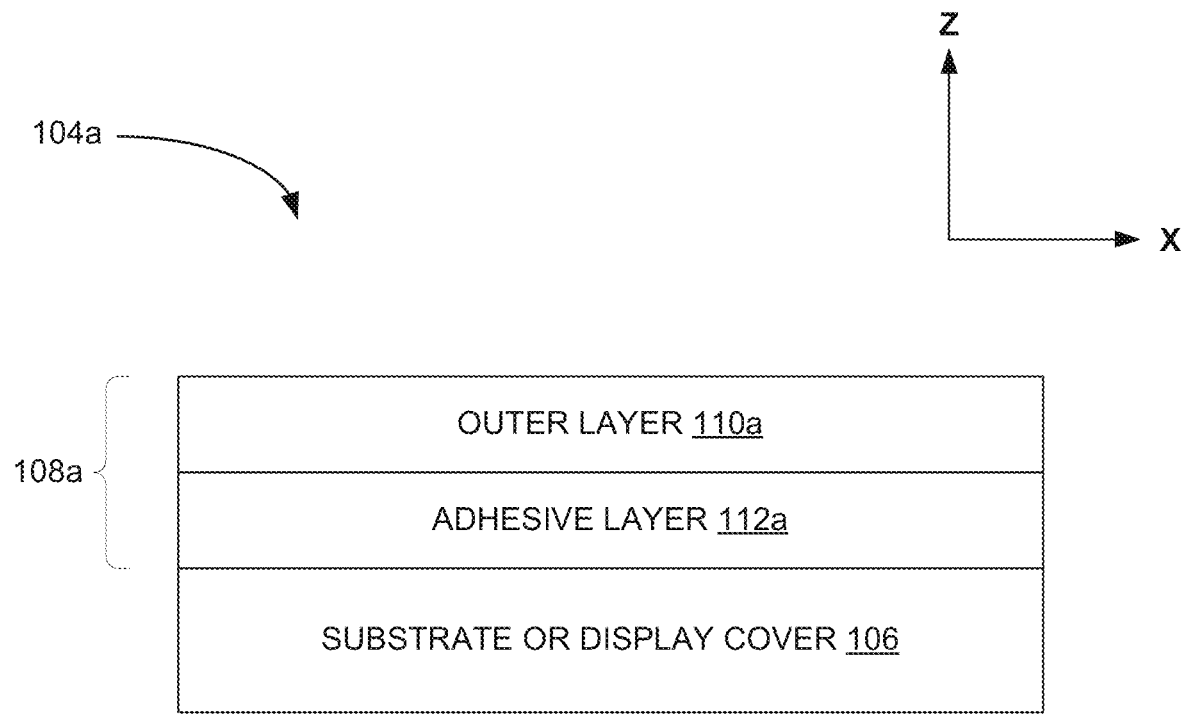
FIG. 3 illustrates a cross-sectional view through the protective assembly of the computing device of FIG. 1 along line 2-2 and including an outer layer according to an example embodiment of the present disclosure.

FIG. 3 illustrates a cross-sectional view through a first embodiment of the protective assembly 104a. As illustrated, in one embodiment the protective layers 108a may include an outer layer 110a coupled to the substrate or display cover 106 via an adhesive layer 112a. The adhesive layer 112a may be configured to bond to the layers in immediate contact therewith (e.g., the substrate or display cover 106 and the outer layer 110a in the embodiment illustrated in FIG. 3). The adhesive layer may comprise a synthetic adhesive such as those based on elastomers, thermoplastics, emulsions, and thermosets. Examples of thermosetting adhesives are epoxy, polyurethane, cyanoacrylate and acrylic polymers. The adhesive is applied to either one or both of the surfaces being bonded. The surfaces are aligned and pressure may be added to aid in adhesion and to rid the bond of air bubbles. Common ways of applying an adhesive include brushes, rollers, swabs, using films or pellets, spray guns, applicator guns and the like. These methods can be performed manually or as part of an automated process.

The outer layer 110a may comprise a hard material in some embodiments. A hard material refers to material having relatively high hardness, typically at a level of 5.0 or higher on the Mohs scale of material hardness which is configured to resist scratches, cracks, and/or other damage. In this regard, in one embodiment the outer layer 110a may comprise a glass material, a hardened plastic material, an acrylic material, a sapphire material, a diamond-like material or coating, a ceramic material, an alumina coating or a nitride coating.

However, an issue with respect to hard materials defining an outer layer is that in instances in which the hard material cracks, the crack is often related to relatively weak edge strength or edge defects. The crack may spread through a substantial portion of the layer, often from one edge to another edge. For example, when a relatively sharp and hard object impacts the outer layer 110a, despite the layer being a relatively hard material, cracks may form in the outer layer. Due to propagation of the cracks through the outer layer 110a, it may be relatively difficult to view the display 102 thereunder after the impact event. Such cracks may also form as a result of a bending movement being applied to the computing device 100. Regardless of the cause of the damage, the propagated cracks in the outer layer 110a may substantially impair the usability of the computing device 100.

Figure 4:
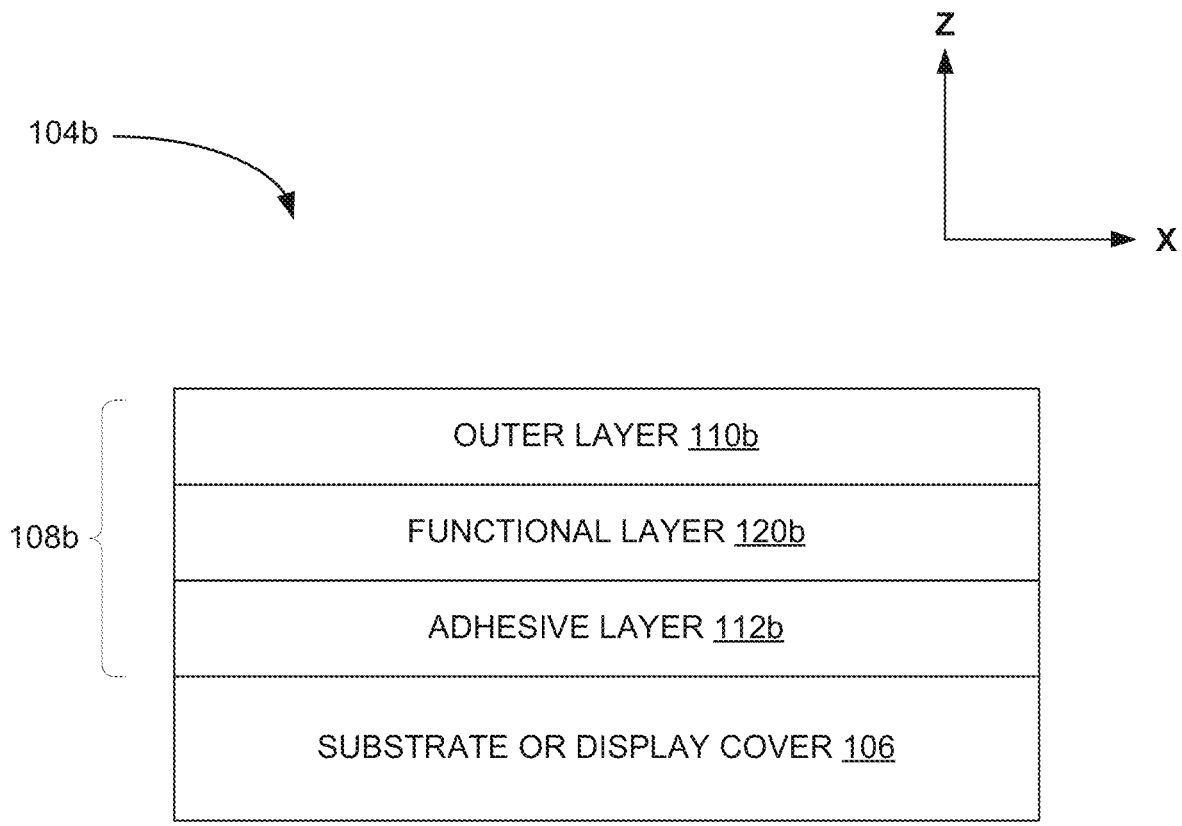
FIG. 4 illustrates a cross-sectional view through the protective assembly of the computing device of FIG. 1 along line 2-2 and including an outer layer, a functional layer, and an adhesive layer according to an example embodiment of the present disclosure.

Accordingly, FIG. 4 illustrates an alternative embodiment of the protective assembly 104b. As illustrated, the protective layers 108b may include an adhesive layer 112b coupled to the substrate or display cover 106, as discussed above. Further, the protective layers 108b may include an outer layer 110b. However, whereas the outer layer 110a included in the embodiment of the protective assembly 104a illustrated in FIG. 3 was coupled directly to the surface of the substrate or display cover 106, the outer layer 110b included in the protective assembly 104b illustrated in FIG. 4 may be coupled to a functional layer 120b.

As illustrated in FIG. 4, the outer layer 110b may be coupled to a functional layer 120b. The functional layer 120b may be positioned immediately under the outer layer 110B in some embodiments, as illustrated in FIG. 4. Further, the functional layer 120b may be directly or indirectly coupled to the adhesive layer 112b. In this regard, the functional layer 120b may be positioned directly or indirectly between the outer layer 110b and the adhesive layer 112b. Note that in FIG. 4 the functional layer is shown directly beneath the outer layer, but the functional layer may be located at any other location within the protective layer assembly in other embodiments of the present disclosure.

The functional layer 120b may comprise a flexible polymer material in some embodiments or various other embodiments of flexible or ductile materials.

Figure 5:
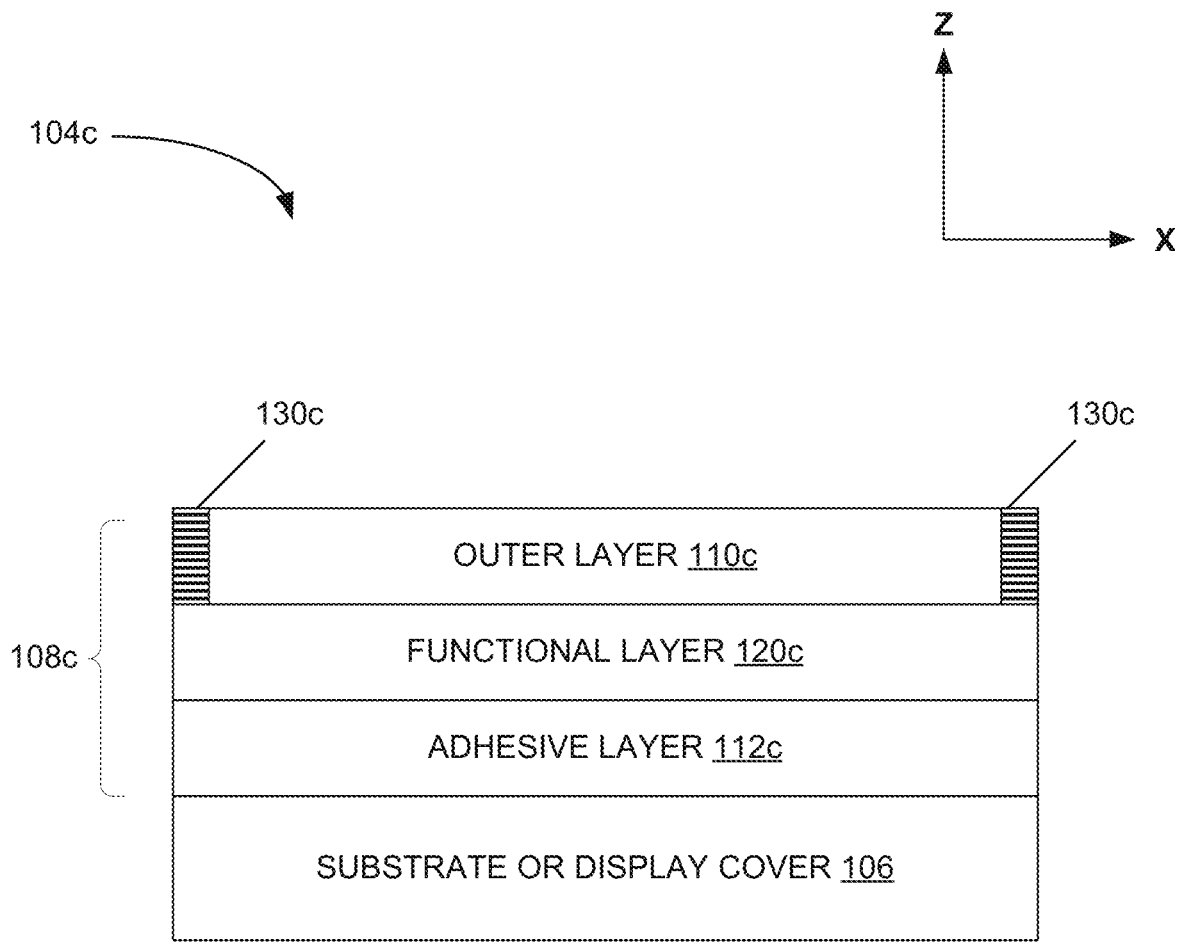
FIG. 5 illustrates a cross-sectional view through the protective assembly of the computing device of FIG. 1 along line 2-2 and including an outer layer, a functional layer, an adhesive layer and an edge strengthening layer according to an example embodiment of the present disclosure.

As illustrated in FIG. 5, an edge strengthening layer 130c may be coupled to the outer layer 110c. In an example embodiment, the edge strengthening layer 130c is applied to the edges of the outer layer 110c.

The outer layer 110c may have defects, such as chips, micro-chips, cracks and micro-cracks. Chips, micro-chips, cracks and micro-cracks, which are often the result of imperfect manufacturing processes and/or damage during material handling, are common defects in sheets of glass, sapphire, other crystalline materials and other hard materials that may be used for the protective layers. Chips, micro-chips, cracks and micro-cracks often become weak points or stress concentration points in hard material layers and thus can become one of the causes of catastrophic damage to the protective layers, as cracks can propagate from the chips and cracks to other portions of the protective layers. The edge strengthening layer 130c may strengthen the edges of the outer layer 110c by sealing chips micro-chips, cracks and micro-cracks to eliminate weak points or mitigate their weakening effects. In this regard, an outer layer 110c with strengthened edges via an edge strengthening layer 130c can resist cracks propagating from the edges and can be more durable to impacts from foreign objects.

Note that a strengthening layer can be applied to the edges of the outer layer, as shown in FIG. 5, but a strengthening layer can also be applied to other areas of the outer layer with beneficial effects, such as applying a strengthening layer to the cut-out area edges for home buttons and speaker holes in the case of protective layers for smart phones and other mobile electronic devices. In the smartphone example, application of a strengthening layer to the cutout edges can strengthen the respective edges, and thereby strengthen the entire protective layer, by filling in chips and sealing cracks to help eliminate or reduce the impact of stress concentration points related to defects. Furthermore, the use of a strengthening layer to fill in chips, cracks and other defects is not limited to edge areas, but rather can be applied with similar strengthening benefits to any surface of the protective layers, including the non-edge areas, to fill in and seal chips, micro-chips, cracks, and micro-cracks, and other defects to provide strengthening benefits to the protective layers.

The strengthening material (e.g., for the edge strengthening layer 130c) can be a plastic resin, an acrylic resin or an epoxy resin that is cured to harden the resin. It can also be a fracture sealer such as triethylenetetramine resin and hardener. Alternatively, it can be a cyanoacrylate adhesive or similar fast-acting adhesive, epoxy or sealing material. The strengthening material can be applied manually or by an automated method using a brush, roller, swab or other similar methods. It can also be sprayed on manually or by an automated spraying method. Alternatively, the protective layers can be submerged in resin or other similar strengthening materials and then cured to harden the resin, or by other similar methods used to seal and strengthen similar materials.

Figure 6:
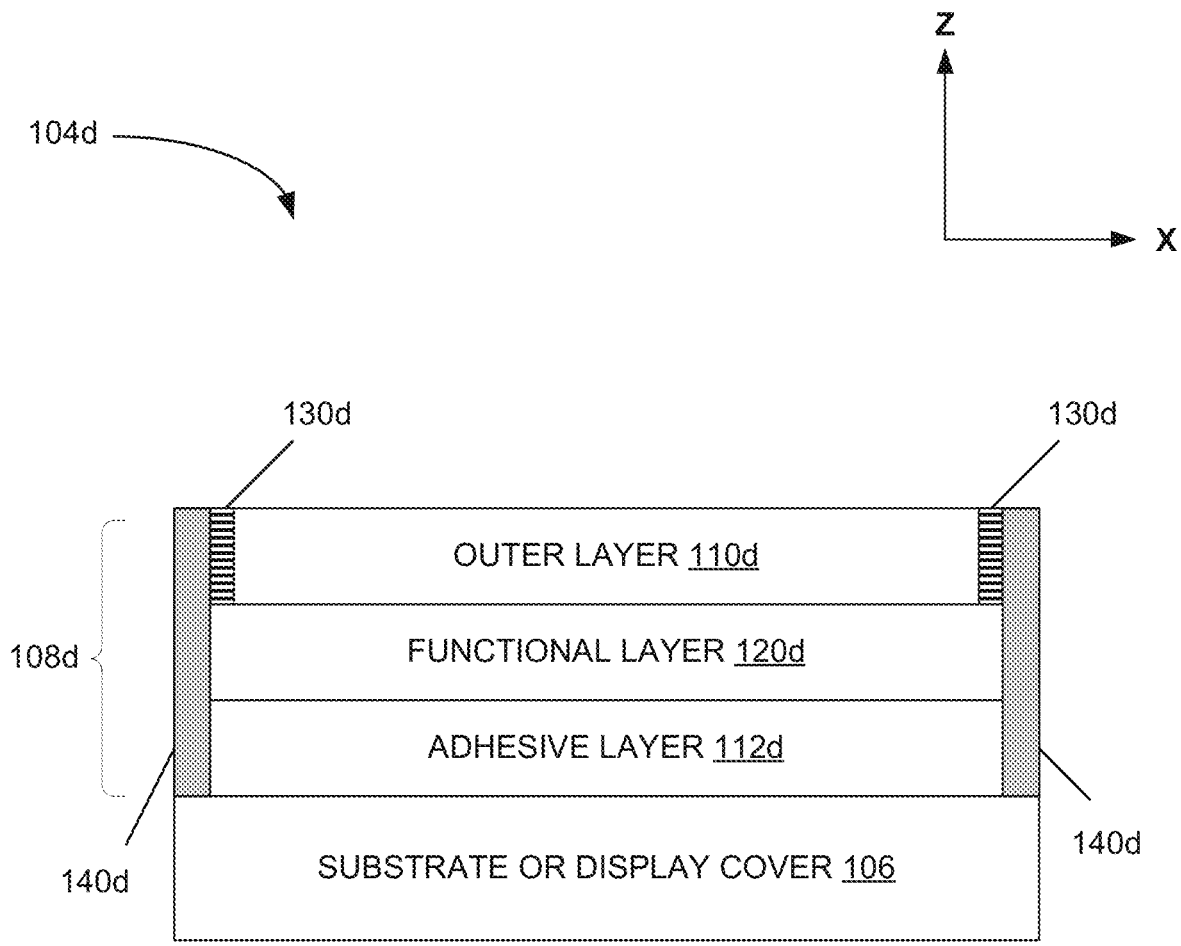
FIG. 6 illustrates a cross-sectional view through the protective assembly of the computing device of FIG. 1 along line 2-2 and including an outer layer, a functional layer, an adhesive layer, an edge strengthening layer and an edge bumper layer according to an example embodiment of the present disclosure.

As illustrated in FIG. 6, an edge bumper layer 140d may be coupled to the outer layer 110d. In some embodiments, the edge bumper layer 140d may be coupled to the functional layer 120d and the adhesive layer 112d. In some embodiments, the edge bumper layer 140d is disposed at the edges of the outer layer 110d, functional layer 120d, and/or the adhesive layer 112d. In other embodiments, the edge strengthening layer 130d is disposed between the edge of the outer layer 110d and the edge bumper layer 140d as illustrated in FIG. 6. The edge bumper layer 140d can comprise a flexible polymer material, a rubber or rubberized material in some embodiments or various other embodiments of flexible, ductile or rigid materials such as a thermosetting polymer, hardened resins (such as plastic, polyester or epoxy resins), acrylic, glass, composite ceramics, crystalline materials such as sapphire or aluminum oxide, or metals such as aluminum or titanium. The edge bumper layer 140d can be adhered to the outer layer 110d, functional layer 120d, and/or the adhesive layer 112d directly if the edge bumper layer material has adhesive properties or by using a synthetic adhesive such as those based on elastomers, thermoplastics, emulsions, and thermosets. Examples of thermosetting adhesives are epoxy, polyurethane, cyanoacrylate and acrylic polymers. The adhesive is applied to either one or both of the surfaces being bonded. The surfaces are aligned and pressure may be applied to aid in adhesion and to rid the bond of air bubbles. Common ways of applying an adhesive include brushes, rollers, swabs, using films or pellets, spray guns and applicator guns. These methods can be performed manually or as part of an automated process.

Figure 7:
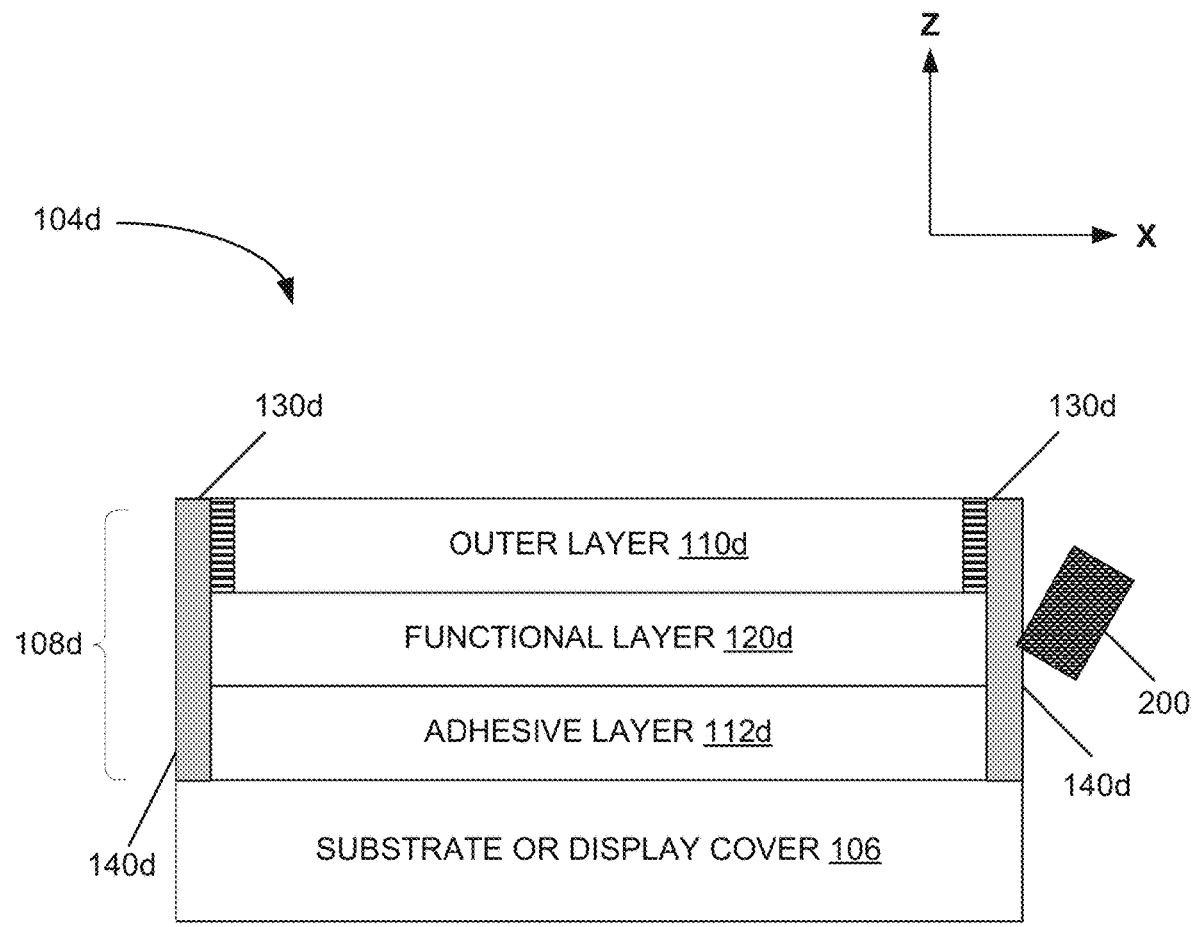
FIG. 7 illustrates a foreign object impacting the protective assembly of FIG. 6.

The edge bumper layer 140d provides a shock-absorbing or shock-deflecting protective layer to the edges of the outer layer 110d by dissipating impacts from foreign objects that could damage the edges of outer layer 110d. In this regard, an outer layer 110d with an edge bumper layer 140d can avoid edge damage and can resist cracks propagating from the edges. Thus, as illustrated in FIG. 7, when a foreign object 200 impacts the edge bumper layer 140d, the outer layer 110d and the substrate or display cover 106 may avoid damage and substantially retain their respective structural integrities.

Further, to the extent the edge bumper layer 140d is damaged from impact or other events, such damage remains localized to a relatively small area. In this regard, by forming the multiple horizontal edge layers of the edge strengthening layer 130d and the edge bumper layer 140d, damage to the edge bumper layer 140d may not propagate through the outer layer 110d or the substrate or display cover 106. Rather, only the area of the edge bumper layer 140d actually impacted by the foreign object 200 may be affected. Thus, the display cover or substrate of the device, and also the protective or functional layers applied to the display cover or substrate of the device are protected from damage that may be caused by impact with a foreign object.

Additionally, in the embodiments that include an edge bumper layer, the display 102 remains substantially viewable and useable, as the edge bumper layer does not block or cover the display 102.

As illustrated in FIG. 4, the protective layers may further comprise a functional layer 120b positioned between the outer layer 110b and the substrate or display cover 106. The functional layer 120b can be configured to enhance the functionality of the protective layers 108b. Various functional layers, provided alone or in combination, may be employed, as described in the paragraphs below. These include but are not limited to electrically conductive layers, thermally conductive layers, ultrasonically conductive layers, infrared transmission layers, electromagnetic radiation shielding layers, magnetic resonance transmission layers, magnetic induction transmission layers, waveguides for electromagnetic transmission, radio frequency transmission layers, and others.

The use of electrically conductive material layers is important for the purpose of improving the touch sensitivity of a device's user interface. Many electronic devices include biometric identification mechanisms that employ touch-sensitive user interfaces based on capacitive touch technologies. Capacitive touch technologies typically require the transmission of electrical signals from the device to a targeted user interface surface of the device, such that a user's touch interacts with the capacitive field as a user interface. Materials that reduce the device's capacitive field, such as glass and other materials with electrical insulating effects, can reduce touch sensitivity, thus reducing device functionality and negatively impacting a user's experience. Whereas a functional layer with electrically conductive material, such as graphene, sapphire, silver, copper, indium tin oxide, aluminum zinc oxide, other transparent conductive oxides (such as fluorine doped tin oxide and doped zinc oxide), conductive polymers, metal grids, carbon nanotubes, nanowires and ultra-thin metals for example, can improve electrical transmission and thereby preserve or improve the touch sensitivity of the device and have a positive impact on the user experience. Functional layers of electrically conductive material can be located inside or on the surface of a device, inside or on the surface of a substrate or display cover, between a display cover and a protective outer layer, on the outside of an outer layer, or on the inside or outside of a device encasement or housing. Electrically conductive material layers can be deposited on a surface through various deposition methods, including metal organic chemical vapor deposition, metal organic molecular beam deposition, spray pyrolysis, ultrasonic nozzle sprayed graphene oxide, air sprayed silver nanowire, pulsed laser deposition, magnetron sputtering, and others.

The use of thermally conductive material layers is important for the purpose of assisting in the reduction of the temperature of the display cover or device. Over-heating of the device is a concern with many electronic devices, as heat can be generated by the device's computer processing system, the battery system and other device systems. Heat can build up within the device, within the display cover, and within protective layers and encasements, particularly since many device materials are thermal insulators, (e.g., glass). Consistently elevated device temperatures can reduce the battery life of a battery-powered device, in terms of degradation of battery performance over its lifetime of charging and discharging. Also, elevated device temperatures can result in reduced device performance as computing processing speeds are typically reduced by the device's software algorithms at elevated temperatures to protect sensitive device circuits. Furthermore, the user's experience is negatively affected by elevated device temperatures, particularly for those users placing the device near body parts during use. A thermally-conductive material layer, such a layer of graphene, carbon nanotubes, diamond-like coating, sapphire, silver, copper, aluminum, aluminum nitride, aluminum oxide, gold, or thermally-conductive grease, as examples, can facilitate and enable thermal transmissions through the functional layer to assist in reducing the device temperature. Functional layers of thermally-conductive material can be located inside or on the surface of a device, inside or on the surface of a substrate or display cover, between a display cover and a protective outer layer, on the outside of an outer layer, or on the inside or outside of a device encasement or housing. Thermally conductive material layers can be deposited on a surface through various deposition methods, including metal organic chemical vapor deposition, metal organic molecular beam deposition, spray pyrolysis, ultrasonic nozzle sprayed graphene oxide, air sprayed silver nanowire, pulsed laser deposition, physical vapor deposition, magnetron sputtering, or manual or automated application using brushes, rollers, swabs or sprayers in the case of thermally conductive grease materials.

The use of ultrasonically and acoustically-conductive material layers is also important for the purpose of improving the transmission and accuracy of ultrasonic-based security and identification systems. Some electronic devices employ security and biometric identification (fingerprint) systems using ultrasonic sensing and touch technologies. Ultrasonic sensing and touch technologies typically require the transmission of ultrasonic signals from the device to a targeted user interface surface of the device, such that a user's touch interacts with the ultrasonic field as a user interface. Materials that reduce the device's ultrasonic transmission can reduce ultrasonic touch sensitivity and accuracy, thus reducing device functionality and negatively impacting the user's experience. Whereas a functional layer with ultrasonic conductive material, such as diamond, diamond-like coatings, graphene, silicon, beryllium, titanium and molybdenum, as examples, can improve ultrasonic transmission and thereby preserve or improve the ultrasonic touch sensitivity and accuracy of the device and have a positive impact on the user's experience. Functional layers of ultrasonic conductive material can be located inside or on the surface of a device, inside or on the surface of a substrate or display cover, between a display cover and a protective outer layer, on the outside of an outer layer, or on the inside or outside of a device encasement or housing. Ultrasonically and acoustically-conductive material layers can be deposited on a surface through various deposition methods, including metal organic chemical vapor deposition, metal organic molecular beam deposition, spray pyrolysis, ultrasonic nozzle sprayed graphene oxide, pulsed laser deposition, physical vapor deposition, magnetron sputtering, or manual or automated application using brushes, rollers, swabs or sprayers depending on the form of the materials.

The use of an anti-reflective layer as a functional layer is important for increasing visible light transmission from the device to the user and for reducing the need for battery power as compared to screens without anti-reflection materials. Reflectivity is important for the user's perception of device display quality, as clear and bright displays resulting from the use of anti-reflective materials are more appealing than dull or dark displays that can result from reflectivity problems. Furthermore, display surfaces with high reflectivity must typically use more battery power to brighten the screen to overcome reflectivity losses in providing an adequate display brightness. From a device user's perspective, a dull, dark display that is not an efficient use of battery power will have a negative impact on device performance and the user's experience. An anti-reflective material layer, as commonly found in the optical industry, can reduce reflectivity and result in a display that appears visible and noticeably brighter to the user. Functional layers of anti-reflective material can be located inside or on the surface of a device, inside or on the surface of a substrate or display cover, between a display cover and a protective outer layer, on the outside of an outer layer, or on the inside or outside of a device encasement or housing. Anti-reflective material layers can be deposited on a surface through various deposition methods, including metal organic chemical vapor deposition, metal organic molecular beam deposition, spray pyrolysis, ultrasonic nozzle sprayed graphene oxide, pulsed laser deposition, physical vapor deposition, magnetron sputtering, and other methods.

The use of material in a functional layer to improve transmission of infrared light can have a positive effect on device performance for devices using infrared applications. Infrared light is generally in the wavelength range of 700 nanometers to 1 millimeter and generally is not visible to the human eye. Infrared light applications may include heat-sensing cameras, image sensing in low visible light conditions, security applications to detect movement in low-light conditions, remote control communications such as that used for controlling televisions and other audio-visual equipment, and for detecting infrared ink used in anti-forgery and other secure identification applications. Materials that reduce the device's transmission of infrared light, including some glass products with relatively low transmittance of infrared light, can reduce or prohibit functionality of infrared applications, and can also have the effect of trapping heat generated by infrared light waves. Whereas a functional layer with material that preserves or improves infrared light transmission, such as sapphire, yttrium oxide and other crystalline ceramics, as examples, can improve device performance and have a positive impact on the user's experience. Functional layers of materials that improve infrared light transmission can be located inside or on the surface of a device, inside or on the surface of a substrate or display cover, between a display cover and a protective outer layer, on the outside of an outer layer, or on the inside or outside of a device encasement or housing.

In another embodiment, electromagnetic shielding material can be used in a functional layer to reduce transmission of potentially harmful electromagnetic radiation to device users and to reduce electromagnetic interference (EMI) to sensitive components of the communication, display and computing systems of the device. If left unshielded, EMI can cause damage to sensitive systems and can also reduce functionality of the systems. User exposure to harmful device radiation is a concern in the mobile electronic device industry, and shielding is an important mechanism for reducing user exposure to device radiation. An example of electromagnetic shielding is the use of indium tin oxide layers, or coatings or patterns of indium tine oxide grids on display covers or within protective layer assemblies. Other materials for an electromagnetic shielding functional layer are aluminum zinc oxide, other transparent conductive oxides (such as fluorine doped tin oxide and doped zinc oxide), metal grids, nanowires and ultra-thin metals for example. Indium tin oxide and other materials can be applied to protective layers by a number of methods, including metal organic chemical vapor deposition, metal organic molecular beam deposition, spray pyrolysis, ultrasonic nozzle sprayed graphene oxide, air sprayed silver nanowire, pulsed laser deposition, physical vapor deposition, magnetron sputtering, or others. Another example step in the creation of an electromagnetic shielding pattern is an etching process, whereby a continuous layer of indium tin oxide (or other material) is selectively etched to create a grid or other pattern design, with the objective of blocking targeted electromagnetic radiation waves while allowing transmission of visible light. Etching materials, equipment and process are well-known to those skilled in the art. In this example, an indium tin oxide grid may provide the benefits of reducing targeted electromagnetic radiation while allowing visible functionality of the layer. Functional layers of electromagnetic shielding can be located inside or on the surface of a device, inside or on the surface of a substrate or display cover, between a display cover and a protective outer layer, on the outside of an outer layer, or on the inside or outside of a device encasement or housing.

The use of material in a functional layer to improve magnetic resonance transmission and coupling can have a positive effect on the ability to wirelessly charge the device's battery using a magnetic resonant coupling system. Magnetic resonant coupling systems are a mechanism to transmit electricity wirelessly using magnetic waves. These systems have the advantage of wirelessly charging several battery powered devices at once, while freeing device users from being tethered to a charging cord or an electrical outlet. Magnetic resonant transmissions are required for these systems to function, thus there is a need for functional layers that improve or preserve the magnetic resonance transmission of the systems. Functional layers of materials that improve magnetic resonant transmission, such as indium tin oxide grids, doped zinc oxide grids, nanowires, thin metal grids, and other materials and architectures designed to optimize magnetic resonance transmission can be located inside or on the surface of a device, inside or on the surface of a substrate or display cover, between a display cover and a protective outer layer, on the outside of an outer layer, or on the inside or outside of a device encasement or housing. Indium tin oxide and other materials can be applied to protective layers by a number of methods, including metal organic chemical vapor deposition, metal organic molecular beam deposition, spray pyrolysis, ultrasonic nozzle sprayed graphene oxide, air sprayed silver nanowire, pulsed laser deposition, physical vapor deposition, magnetron sputtering, or others.

Similarly to magnetic resonant systems, the use of material in a functional layer to improve magnetic induction transmission and coupling can have a positive effect on the ability to wirelessly charge the device's battery using a magnetic induction system. Magnetic induction systems are a mechanism to transmit electricity wirelessly using magnetic waves. These systems have the advantage of wirelessly charging several battery powered devices at once, while freeing device users from being tethered to a charging cord or an electrical outlet. Magnetic induction transmissions are required for these systems to function, thus there is a need for functional layers that improve or preserve the magnetic induction transmission of the systems. Functional layers of materials that improve magnetic induction transmission such as indium tin oxide grids, doped zinc oxide grids, nanowires, thin metal grids, and other materials and architectures designed to optimize magnetic induction transmission can be located inside or on the surface of a device, inside or on the surface of a substrate or display cover, between a display cover and a protective outer layer, on the outside of an outer layer, or on the inside or outside of a device encasement or housing. Indium tin oxide and other materials can be applied to protective layers by a number of methods, including metal organic chemical vapor deposition, metal organic molecular beam deposition, spray pyrolysis, ultrasonic nozzle sprayed graphene oxide, air sprayed silver nanowire, pulsed laser deposition, physical vapor deposition, magnetron sputtering, or others.

The use of material in a functional layer to serve as electromagnetic wave guides to improve electromagnetic transmission and coupling can have a positive effect on the ability to wirelessly charge the device's battery using a magnetic resonant coupling system. Waveguides are used in a variety of applications including optical, sound and electromagnetic applications to direct energy waves in specific directions and magnitudes. A functional layer, made with materials such as indium tin oxide grids, doped zinc oxide grids, nanowires, thin metal grids, sapphire, and other materials and architectures, can be created to function as electromagnetic wave guides to improve or preserve electromagnetic transmissions in devices and systems. Functional layers with electromagnetic wave guides can be located inside or on the surface of a device, inside or on the surface of a substrate or display cover, between a display cover and a protective outer layer, on the outside of an outer layer, or on the inside or outside of a device encasement or housing. Indium tin oxide and other materials can be applied to protective layers by a number of methods, including metal organic chemical vapor deposition, metal organic molecular beam deposition, spray pyrolysis, ultrasonic nozzle sprayed graphene oxide, air sprayed silver nanowire, pulsed laser deposition, physical vapor deposition, magnetron sputtering, or others.

The use of material in a functional layer to improve radio frequency (RF) transmission can provide the benefit of improving RF communications while reducing potentially harmful RF radiation exposure to the device user. RF communication systems are an essential component of many devices now, including devices using near field communications (NFC) for transmitting data. It is important that devices, protective films and device enclosures are capable of adequate RF transmissions for device performance while reducing potentially harmful RF exposure to users. Functional layers for RF transmission can take several forms, including metallic materials such as indium tin oxide, doped zine oxides, nanowires, thin metal grids, sapphire, aluminum oxide, and other materials in patterns designed to optimize transmission performance. Functional layers of RF transmission materials can be located inside or on the surface of a device, inside or on the surface of a substrate or display cover, between a display cover and a protective outer layer, on the outside of an outer layer, or on the inside or outside of a device encasement or housing. Indium tin oxide and other materials can be applied to protective layers by a number of methods, including metal organic chemical vapor deposition, metal organic molecular beam deposition, spray pyrolysis, ultrasonic nozzle sprayed graphene oxide, air sprayed silver nanowire, pulsed laser deposition, physical vapor deposition, magnetron sputtering, or others.

Note that in conventional applications, functional layers included with substrates, or display covers or enclosures may often be applied to the inner or outer surfaces of the substrate, or display cover or enclosure. In conventional devices where the functional layer is applied to the outer surface of the substrate, or display cover or enclosure, no protective layer is typically employed in conventional applications. Accordingly, embodiments of the protective layers of the present disclosure provides benefits in terms of protecting the functional layers by placing the protective layers thereon. Further, by placing the functional layers outside of the substrate, or display cover or enclosure, the functionality thereof can be improved.

Figure 8:
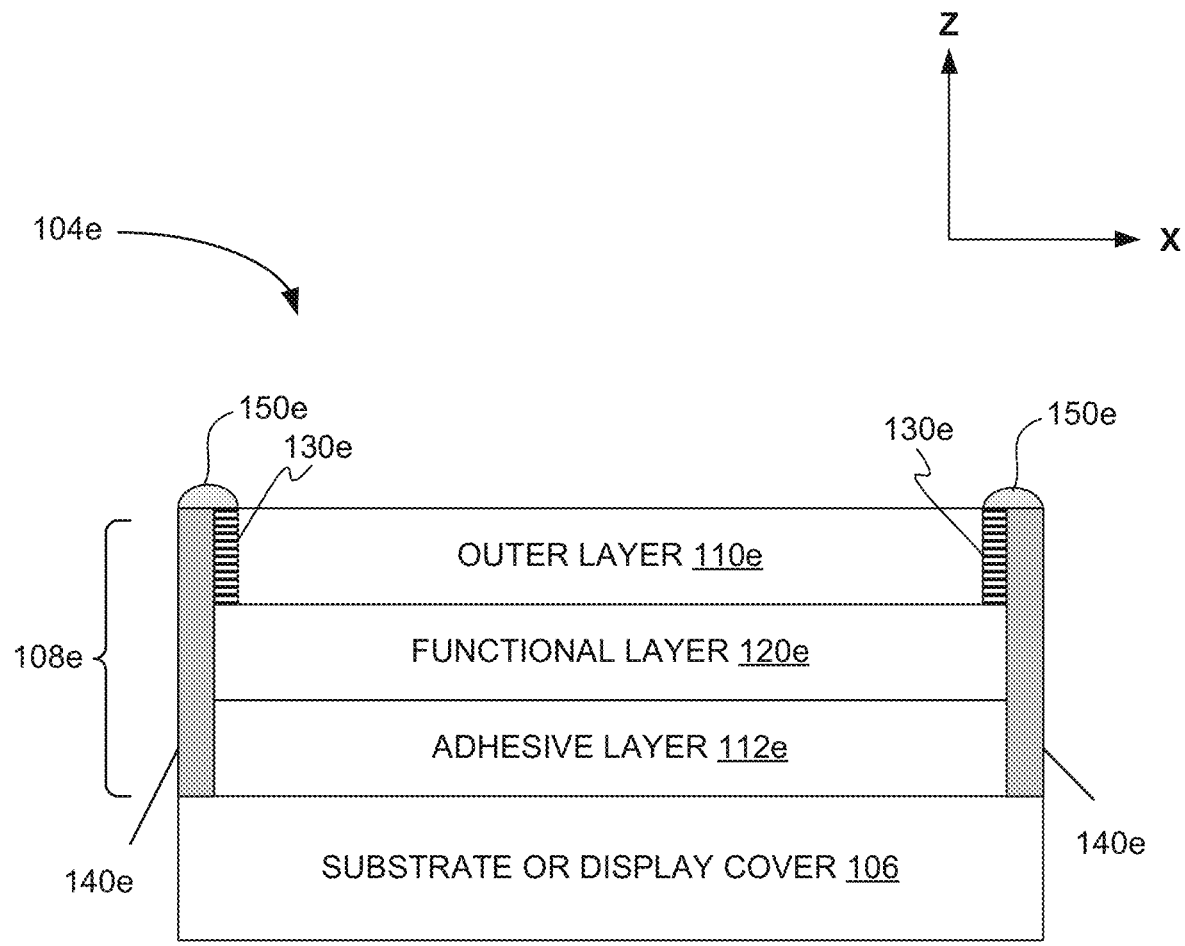
FIG. 8 illustrates a cross-sectional view through the computing device of FIG. 1 along line 2-2 and including an edge bumper cap layer that extends above the top surface of the outer layer according to an example embodiment of the present disclosure.

FIG. 8 illustrates an alternative embodiment of the protective layer assembly 104e. As illustrated, the protective layer assembly 104e may include the substrate or display cover 106 and protective layers 108e. The protective layers 108e may include an adhesive layer 112e, a functional layer 120e, an outer layer 110e, an edge strengthening layer 130e, and an edge bumper layer 140e. However, the protective assembly 104e may differ from previously described embodiments in that an edge bumper cap layer 150e may be coupled to the edge bumper layer 140e and the outer layer 110e. The shape and dimensions of the edge bumper cap layer 150e can be configured to provide impact protection when the edges of the protective layers 108e are subjected to impact primarily at the top surface of the protective layers. Note that the shape of the edge bumper cap layer 150e may include round, chamfered or square edges. The edge bumper cap layer 150e may comprise a flexible polymer material, a rubber or rubberized material in some embodiments or various other embodiments of flexible, ductile or rigid materials such as a thermosetting polymer, hardened resins (such as plastic, polyester or epoxy resins), acrylic, glass, composite ceramics, crystalline materials such as sapphire or aluminum oxide, or metals such as aluminum or titanium. The edge bumper layer 150e can be adhered to the protective layer assembly directly if the edge bumper layer material has adhesive properties, or by using a synthetic adhesive such as those based on elastomers, thermoplastics, emulsions, and thermosets. Examples of thermosetting adhesives are epoxy, polyurethane, cyanoacrylate and acrylic polymers. The adhesive is applied to either one or both of the surfaces being bonded. The surfaces are aligned and pressure may be applied to aid in adhesion and to rid the bond of air bubbles. Common ways of applying an adhesive include brushes, rollers, swabs, using films or pellets, spray guns and applicator guns. These methods can be performed manually or as part of an automated process.

Figure 9:
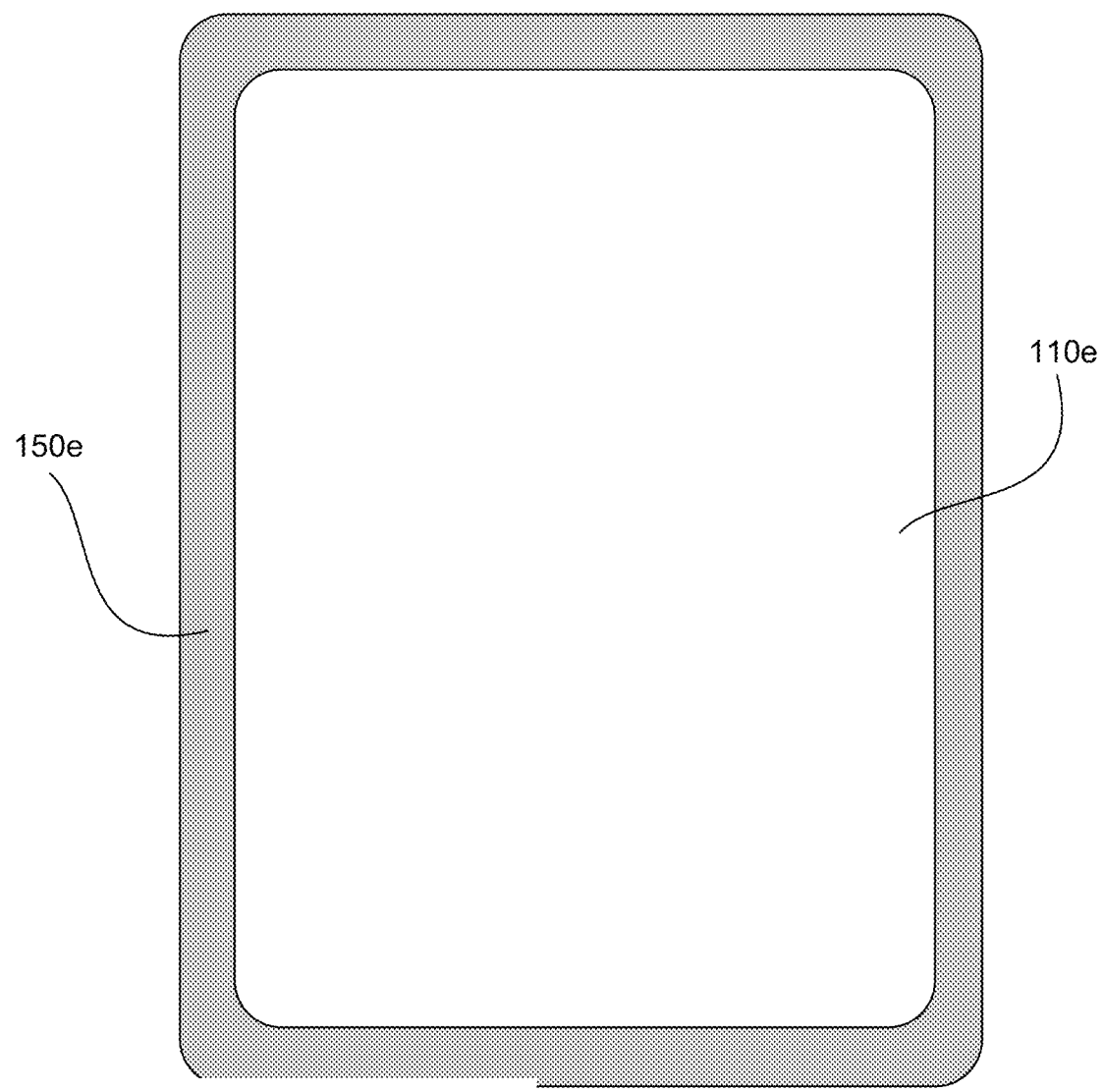
FIG. 9 illustrates a partial enlarged top view of the outer layer of FIG. 8 including the edge bumper cap layer continuously on the perimeter of the outer layer according to an example embodiment of the present disclosure.
Figure 10:
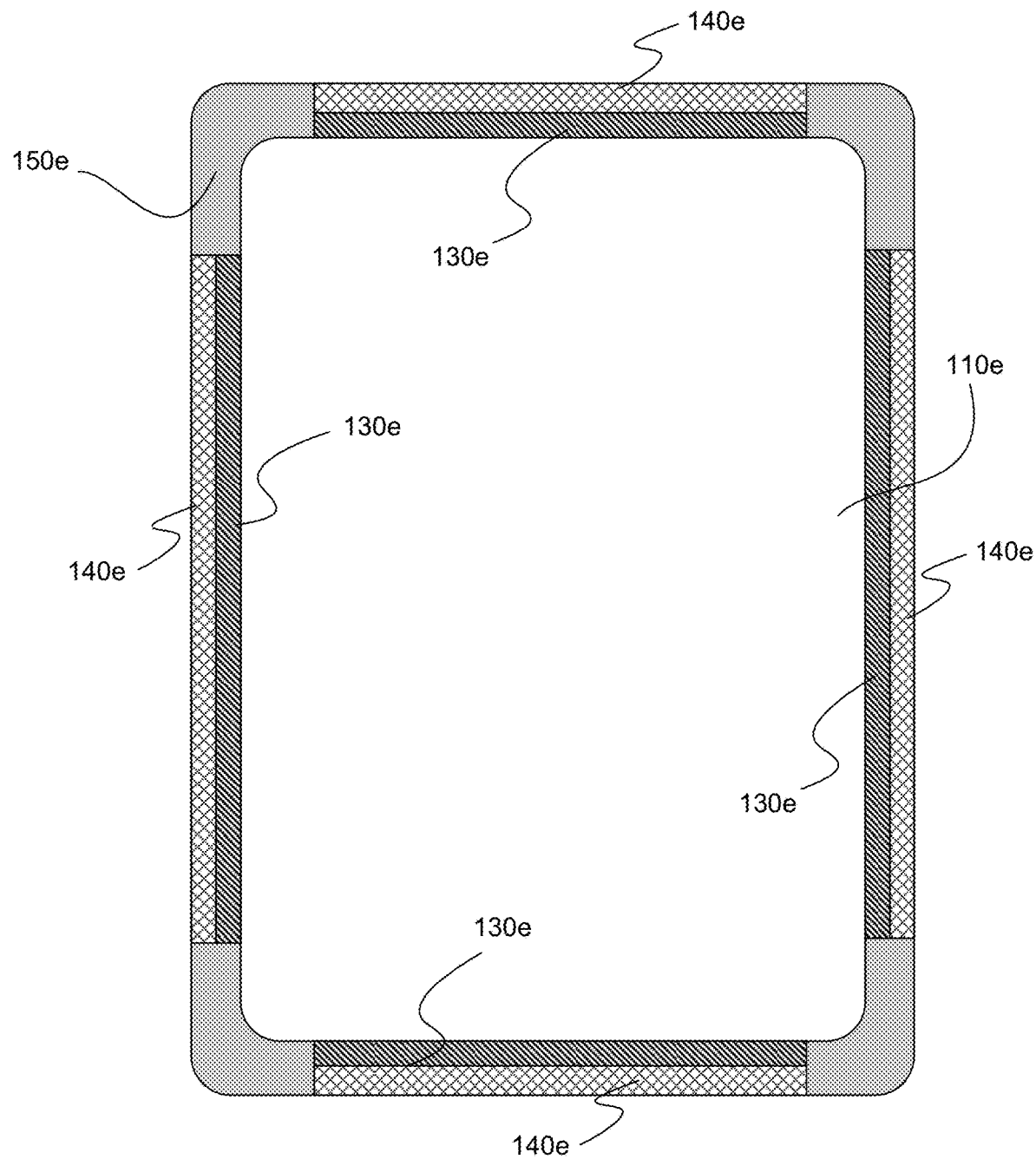
FIG. 10 illustrates a partial enlarged top view of the outer layer of FIG. 8 including the edge bumper cap layer discontinuously on the perimeter of the outer layer, the edge strengthening layer and the edge bumper layer according to an example embodiment of the present disclosure.

FIG. 9 illustrates a top view of a portion of the protective layers 108e. As illustrated, in some embodiments the edge bumper cap layer 150e may continuously be applied to the perimeter of the outer layer 110e. By way of a further example, FIG. 10 illustrates a top view of a portion of the protective layers 108e with a discontinuous application of the cap layer 150e to portions of the perimeter of the outer layer 110e. Also shown in FIG. 10 is the edge strengthening layer 130e as applied to the upper layer 110e and the edge bumper layer 140e as applied to the edge strengthening layer 130e. In this example, the cap bumper layer 150e has been applied to the corner areas of the outer layer 110e, which provides important protection areas against impacts in some applications.

Figure 11:
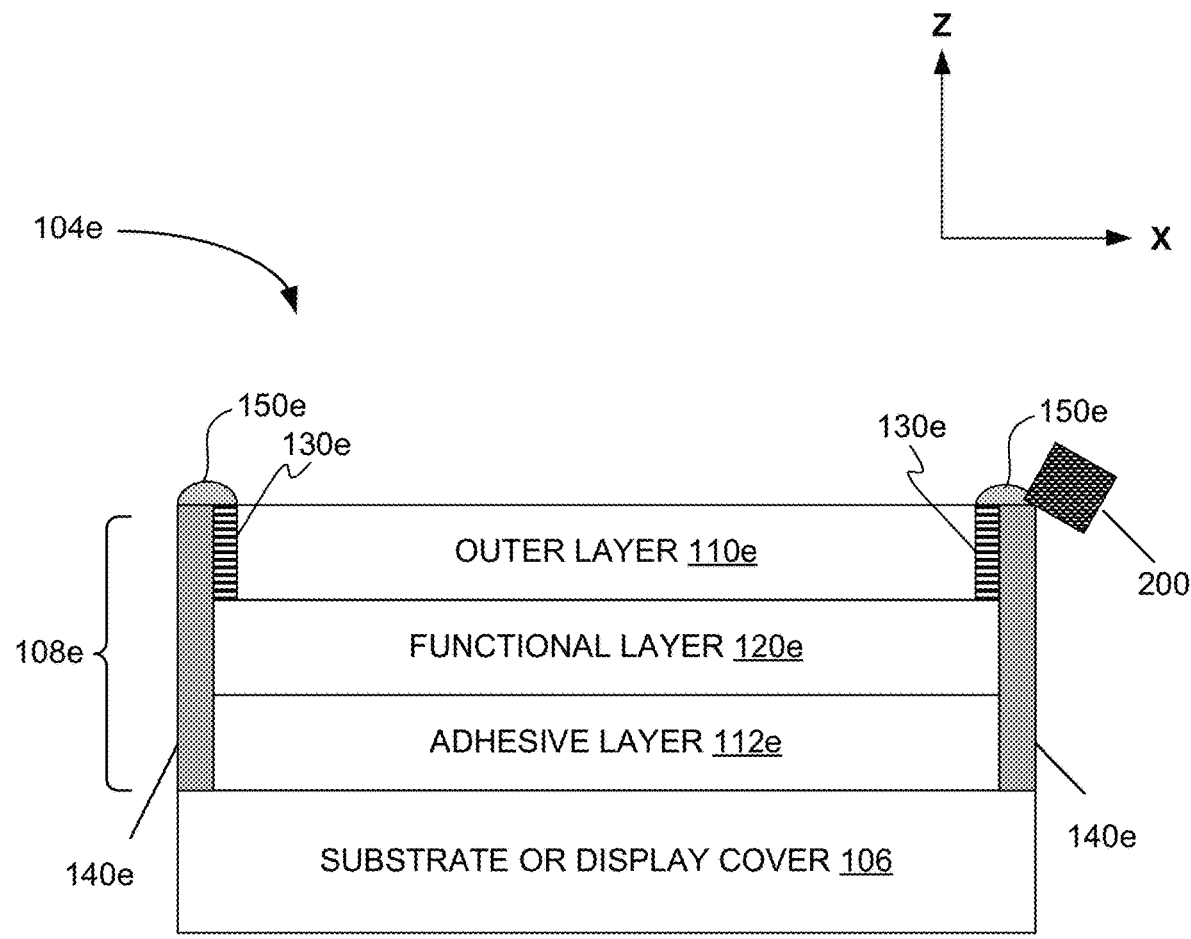
FIG. 11 illustrates a foreign object impacting the protective assembly of FIG. 8.

The edge bumper cap layer 150e provides a shock-absorbing or shock-deflecting protective layer to the outermost top surface edges of the outer layer 110e by dissipating or deflecting impacts from foreign objects that could damage the edges of the outer layer 110e. In this regard, an outer layer 110e with an edge bumper layer 140e and with edge bumper cap layer 150e can avoid or reduce edge damage from impacts primarily to the top surface, and can resist cracks propagating from the edges. Thus, as illustrated in FIG. 11, when a foreign object 200 impacts the edge bumper cap layer 150e, the outer layer 110e and the substrate or display cover 106 can avoid damage and substantially retain their respective structural integrities.

Further, to the extent the edge bumper cap layer 150e is damaged from impact or other event, such damage remains localized to a relatively small area. In this regard, by forming the edge strengthening layer 130e, the edge bumper layer 140e and the edge bumper cap layer 150e, damage to the edge bumper cap layer 150e may not propagate through the outer layer 110e or the substrate or display cover 106. Rather, only the area of the edge bumper cap layer 150e actually impacted by the foreign object 200 may be affected.

Figure 12:
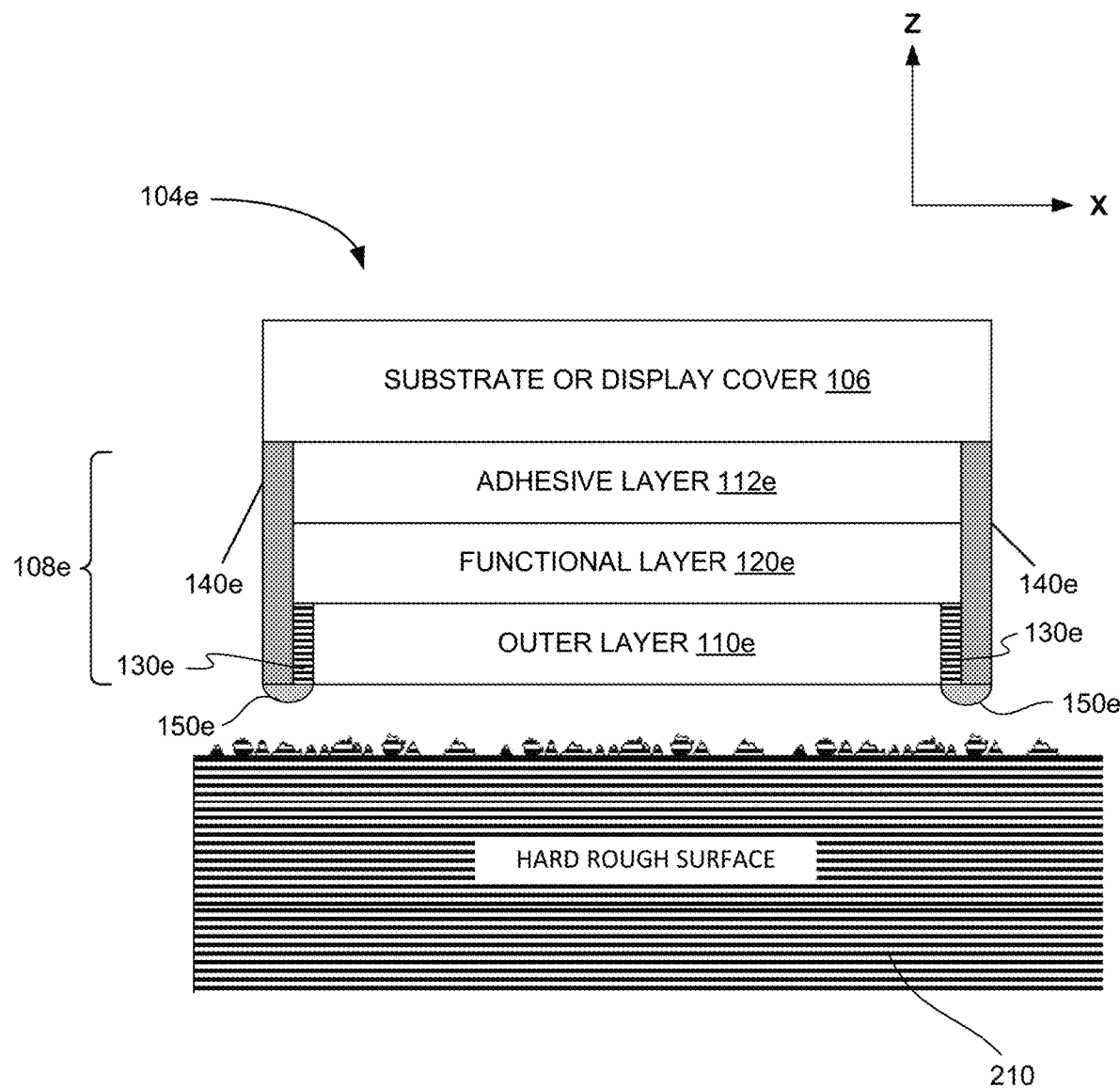
FIG. 12 illustrates the protective assembly of FIG. 8 about to impact a hard, rough surface face-down.

FIG. 12 illustrates the embodiment of the protective layer assembly 104e, with an example representation of protective assembly 104e impacting hard, rough surface 210 face-down (i.e., the device's display facing toward the surface 210). FIG. 12 is used to illustrate an impact event that may occur when a user drops the computing device onto a hard, rough surface face-down. As shown in FIG. 12, the edge bumper cap layer 150e is the first component of the protective layer assembly 104e to come into contact with the hard rough surface 210, and thus absorb or deflect the initial impact. To the extent the edge bumper cap layer 150e is damaged from impact or other events, such damage remains localized to a relatively small area. In this regard, by forming the edge strengthening layer 130e, the edge bumper layer 140e and the edge bumper cap layer 150e, damage incurred by the edge bumper cap layer 150e may not propagate through the outer layer 110e or the substrate or display cover 106. Rather, only the area of the edge bumper cap layer 150e actually impacted by the foreign object 200 may be affected and the display may remain largely viewable and useable.

Figure 13:
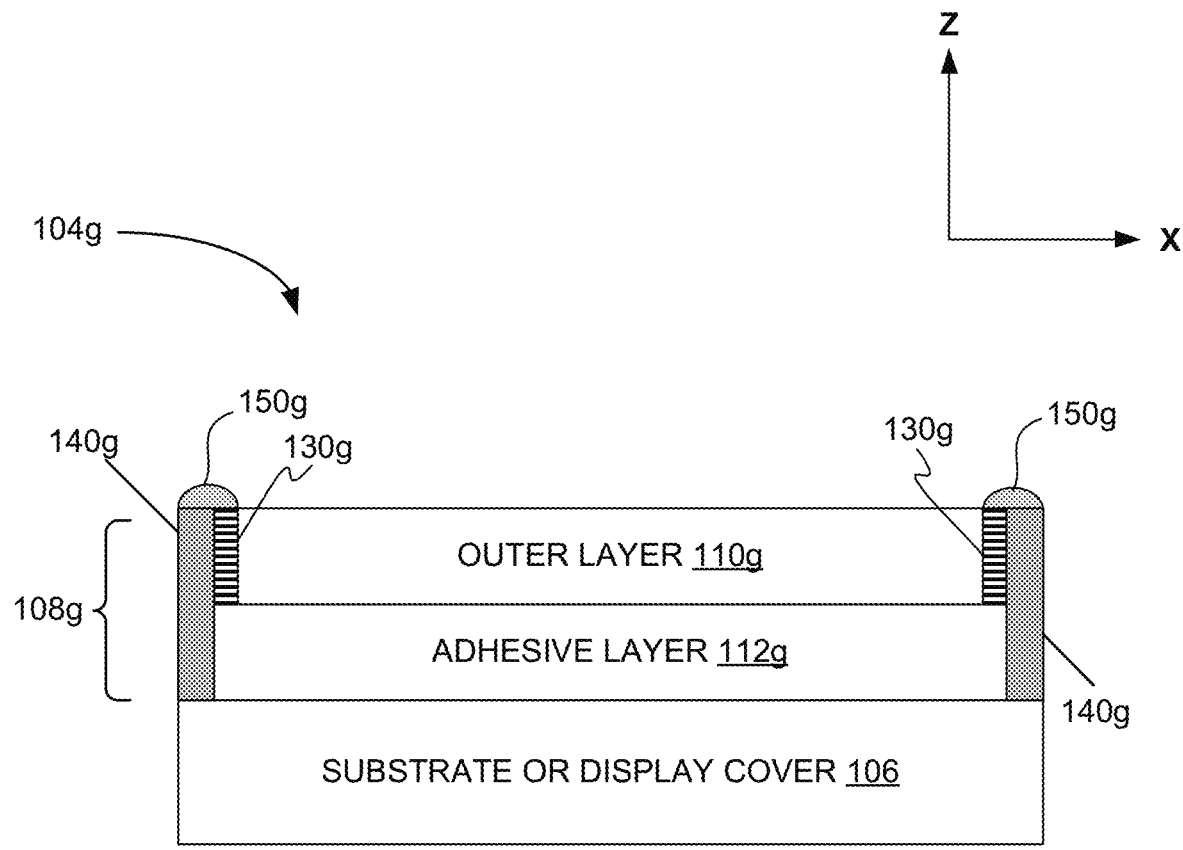
FIG. 13 illustrates a cross-sectional view through the computing device of FIG. 1 along line 2-2 excluding a functional layer according to an example embodiment of the present disclosure.

FIG. 13 illustrates an alternative embodiment of the protective layer assembly 104g. As illustrated, the protective layer assembly 104g may include the substrate or display cover 106 and protective layers 108g. The protective layers 108g may include an adhesive layer 112g, an outer layer 110g, an edge strengthening layer 130g, an edge bumper layer 140g, and an edge bumper cap layer 150g. However, the protective layer assembly 104g may differ from previously described embodiments in that a functional layer is not included. Rather, the outer layer 110g may be directly coupled to the adhesive layer 112g in example embodiments.

Figure 14:
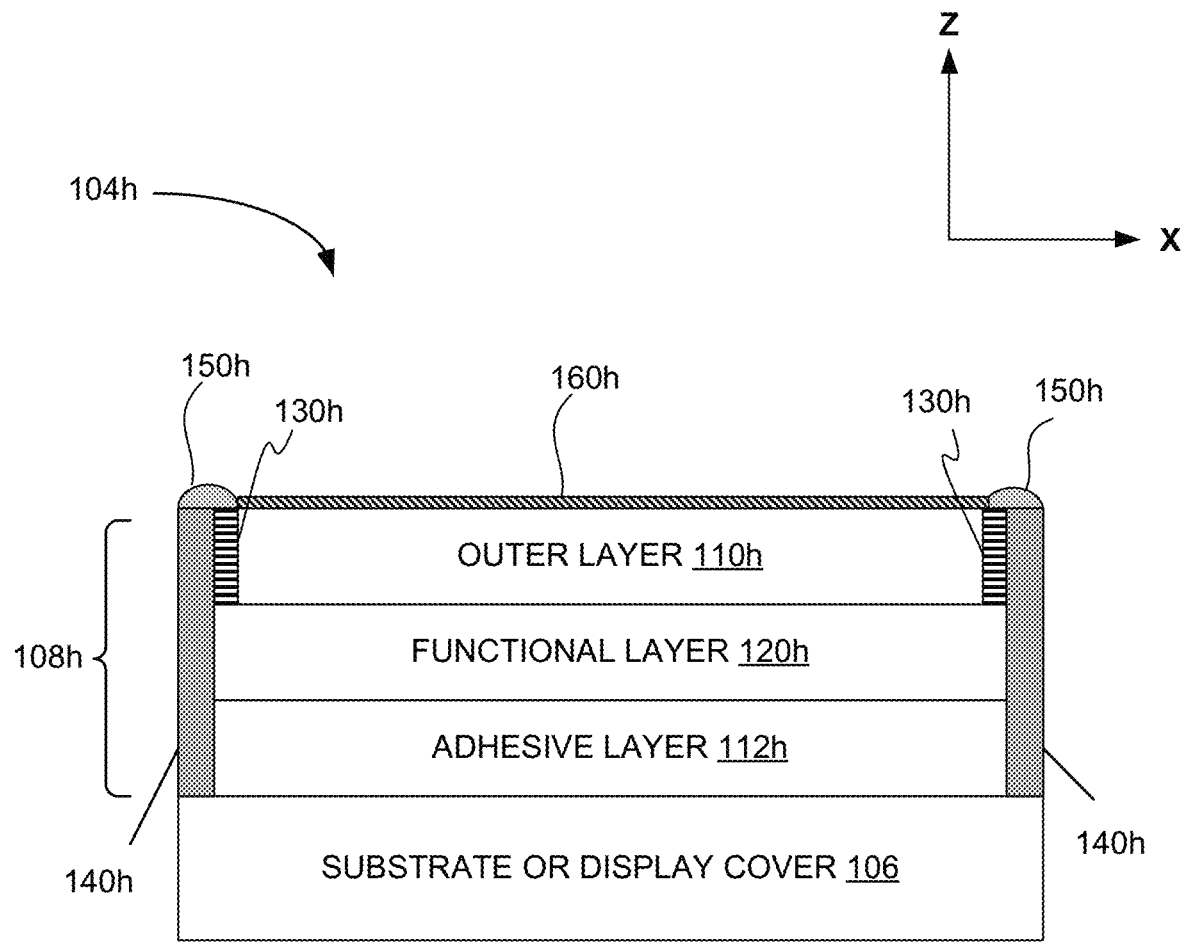
FIG. 14 illustrates a cross-sectional view through the computing device of FIG. 1 along line 2-2 and including an oleophobic layer coupled to the outer layer according to an example embodiment of the present disclosure.

FIG. 14 illustrates an alternative embodiment of the protective layer assembly 104h. As illustrated, the protective layer assembly 104h may include the substrate or display cover 106 and protective layers 108h. The protective layers 108h may include an adhesive layer 112h, a functional layer 120h, an outer layer 110h, an edge strengthening layer 130h, an edge bumper layer 140h, and an edge bumper cap layer 150h. However, the protective assembly 104h may differ from previously described embodiments in that an oleophobic layer 160h may be coupled to the outer layer 110h. The oleophobic layer 160h is intended to reduce the visual and touch impacts of oils, fingerprints and other oily substances that may come in contact with the outer layer 110h. Furthermore, note that the oleophobic layer may be included in any of the embodiments of the protective layer assembly described herein.

Figure 15:
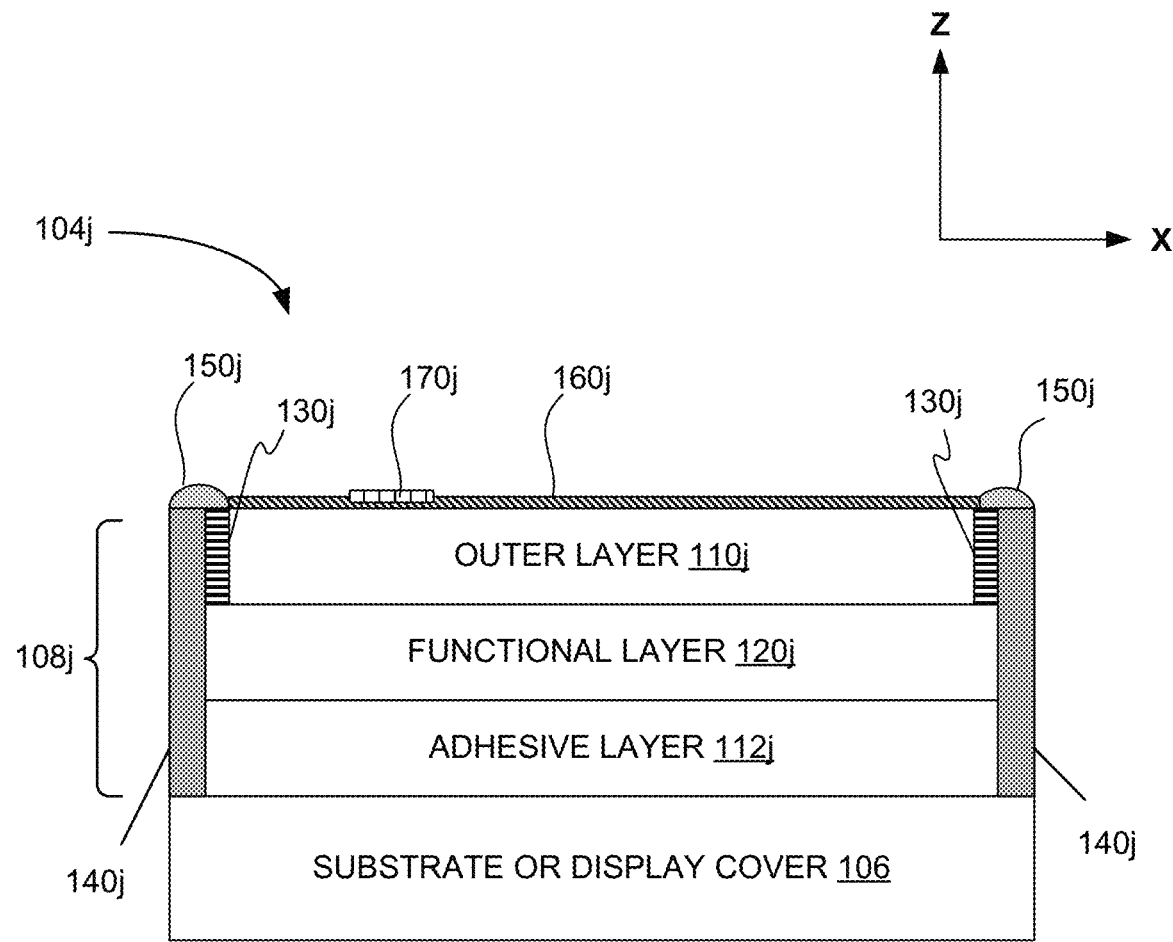
FIG. 15 illustrates a cross-sectional view through the computing device of FIG. 1 along line 2-2 and including luminescent paint or ink markings and infrared ink markings according to an example embodiment of the present disclosure.

FIG. 15 illustrates an alternative embodiment of the protective layer assembly 104j. As illustrated, the protective layer assembly 104j may include the substrate or display cover 106 and protective layers 108j. The protective layers 108j may include an adhesive layer 112j, a functional layer 120j, an outer layer 110j, an edge strengthening layer 130j, an edge bumper layer 140j, an edge bumper cap layer 150j and an oleophobic layer 160j. However, the protective assembly 104j may differ from previously described embodiments in that luminescent paint or infrared ink 170j may be coupled to the surfaces of the protective assembly 104j, for example to the outer layer 110j or the oleophobic layer 160j. The luminescent paint or infrared ink 104j provides unique branding and marking capability to enhance visual appeal and visual effects in settings of low ambient light. Additionally, the luminescent paint or infrared ink 104j can be used to secure document identifiers, anti-forgery protection and other security applications. Note that the luminescent paint or infrared ink 104j includes, but is not limited to, paints, inks, powders and other marking materials that may be visible in low light or ambient light conditions. Marking 170j may also include an invisible ink or security ink marking. The paint or ink 170j may be applied such that it does not interfere with use of the device's display. Further, note that the luminescent paint or infrared ink may be included in any of the embodiments of protective layer assemblies disclosed herein.

The luminescent paint or infrared ink 104j may be applied to any surface of the protective assembly 104j and it may also be mixed with the adhesive layer 112j, the edge strengthening layer 130j, the edge bumper layer 140j, the edge bumper cap layer 150j, and the oleophobic layer 160j.

Note that although the embodiments of the protective layer assembly are generally described herein as being separate, the embodiments may be combined in any various manners. For example, the edge bumper cap layer 150j of the protective layers 108j illustrated in FIG. 15 may include chamfered edges. All other combinations of the embodiments disclosed herein are also contemplated.

As noted above, in some embodiments each of the layers of the protective layer assembly may be substantially transparent. However, in other embodiments of the present disclosure some of the layers of the protective layer assembly may not be transparent. For example, some embodiments of the edge bumper layer and the edge bumper cap layer disclosed herein may not be transparent. Thus, in some embodiments such layers may cover only a portion of the substrate or display cover. For example, in embodiments of the computing device 100 in which the substrate or display cover 106 defines a front plate thereof, layers that are opaque or otherwise optically detrimental may be selectively positioned such that they do not block the display 102. For example, such layers may extend around the perimeter of the display to provide extra protection to the front panel substrate or display cover at the corners and edges of the computing device 100.

The overall thickness (see, for example the Z-axis in FIG. 4) of the protective layer assembly may be minimized in accordance with embodiments of the present disclosure. For example, in one embodiment the overall thickness of the protective layer assembly 104 may be approximately 10 micrometers to 1.5 millimeters when used on or applied to substrates or display covers for electronic devices. In an example embodiment, each respective layer of the protective layer assembly 104 may have a thickness from approximately 5 to 10 micrometers. In another embodiment, each respective layer of the protective layer assembly 104 may have a thickness from approximately 1 micrometer to 10 micrometers.

In other applications of the protective layer assembly described herein, such as automotive or building windows, the protective layer assembly may define a thickness up to approximately 2.5 millimeters in order to provide additional impact protection and damage resistance. In an example embodiment, use of a thin protective layer assembly may prevent the protective layer assembly to behave in an independent fashion relative to a glass substrate or display cover. That is, the protective layer assembly may substantially function as if it is a portion of the substrate or display cover of the device. In this case, a user may not be able to pry at the edges of the protective layer assembly to remove it from the substrate or display cover. Further, the protective layer assembly may not be visible at the edges of the substrate or display cover. Accordingly, the cosmetic appearance of the device employing the protective layer assembly can be improved.

Figure 16:
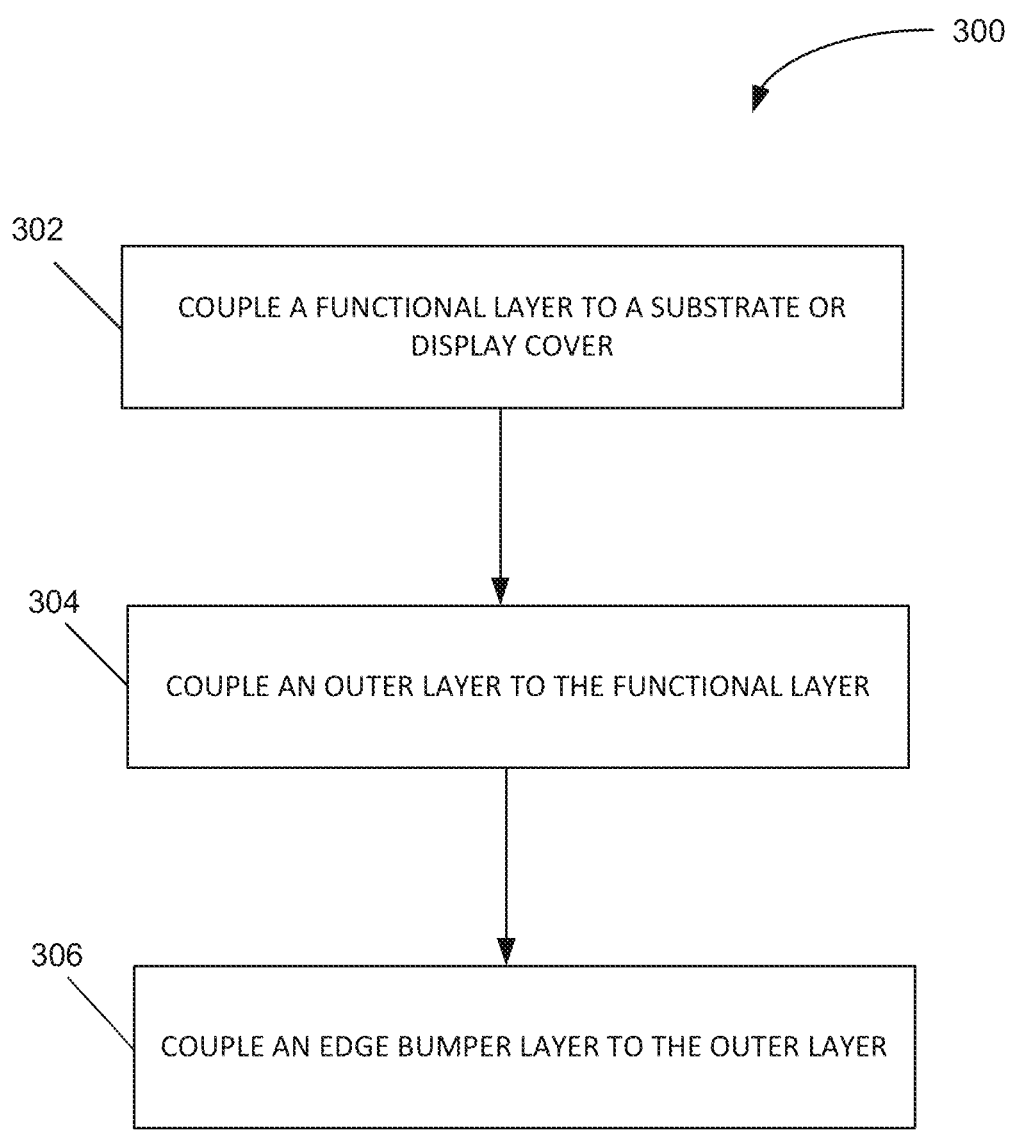
FIG. 16 schematically illustrates a method for forming a protective assembly according to an example embodiment of the present disclosure.

A related method for forming a protective layer assembly is also provided. As illustrated in FIG. 16, the method 300 may include coupling a functional layer to a substrate or display cover of a device at operation 302. Further, the method 300 may include coupling an outer layer to the functional layer at operation 304. The method 300 also includes coupling an edge bumper layer to the outer layer at operation 306.

In some embodiments coupling the outer layer to the functional layer at operation 304 may comprise applying a continuous adhesive layer to the outer layer. For example, the adhesive layer may be deposited by manual methods in some embodiments. However, various other example embodiments of methods for applying the adhesive layer to the outer layer may include an automated liquid (e.g., spray) application.

Further, coupling the functional layer to the substrate or display cover at operation 302 may comprise applying an adhesive to the functional outer layer and the substrate or display cover. In another embodiment coupling the functional layer to the substrate or display cover at operation 302 may comprise depositing the functional layer directly on the substrate or display cover.

The remaining layers, including the edge strengthening layer, the edge bumper layer, the edge bumper cap layer, the oleophobic layer and the paint or ink may also be applied via one or more of physical vapor deposition, liquid application by manual or automated methods and direct deposition in some embodiments. Additionally, in some embodiments, the protective layer assembly (including the outer layer, the functional layer, the edge strengthening layer, the edge bumper layer, the edge bumper cap layer, the oleophobic layer, and/or the ink or paint layer) may be manufactured as a unitary sheet or assembly, and then applied to the substrate or display cover using the adhesive layer. In some embodiments, the protective layer assembly is provided to a user as a unitary sheet or assembly with the adhesive layer included. The adhesive layer may be covered by a removable protective film that a user can remove to apply the protective layer assembly to a device's substrate or display cover. In some embodiments, the protective layer assembly may be applied directly to the display of the device (rather than the substrate or the display cover of the device).

Figure 17:
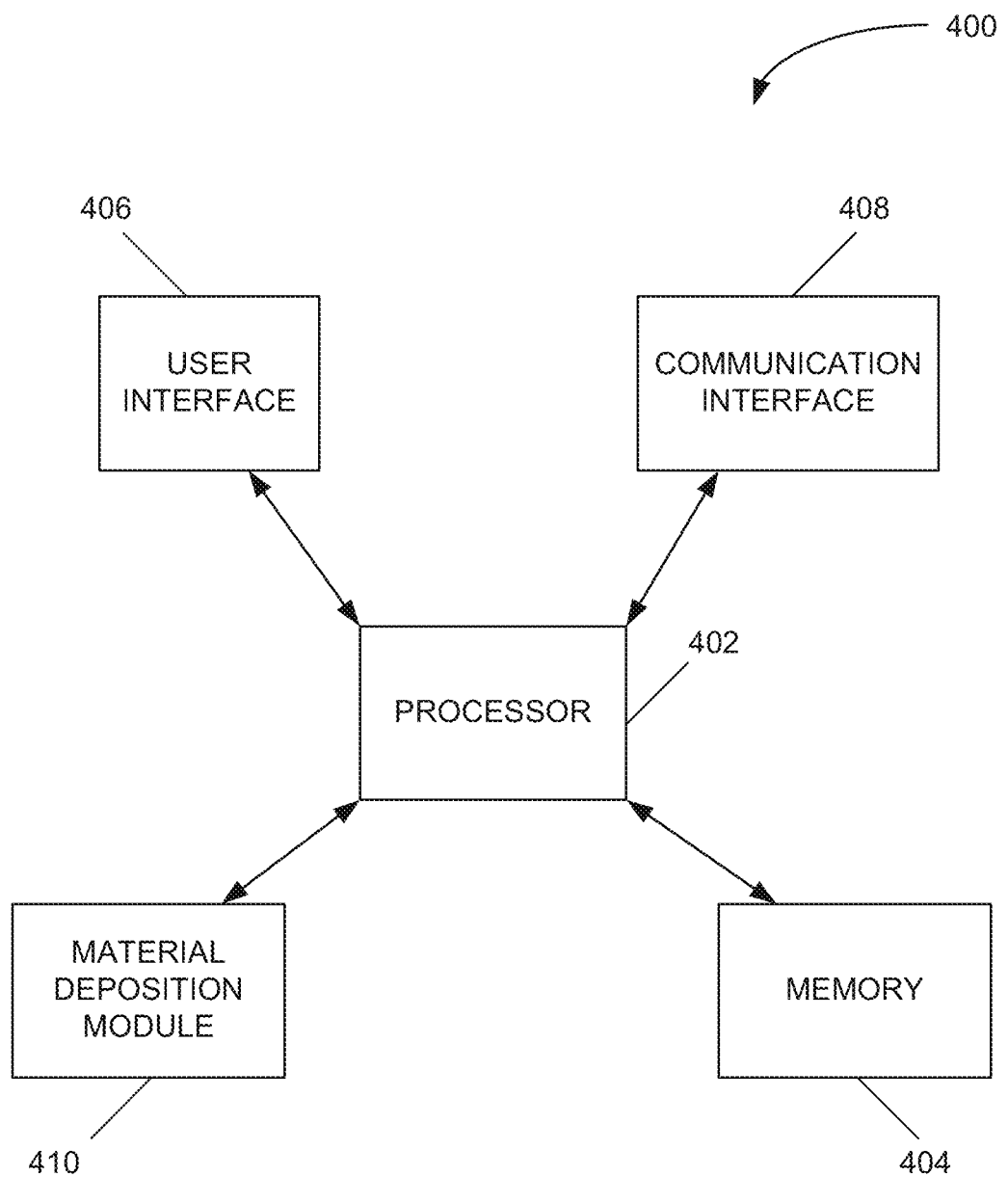
FIG. 17 schematically illustrates a block diagram of an electronic device according to an example embodiment of the present disclosure.

FIG. 17 is a block diagram of a computing device 400 suitable for use with the described embodiments. In one example embodiment the computing device 400 may be embodied as a controller configured for controlling operations performed in depositing layers of the protective layer assembly as described herein.

The computing device 400 illustrates circuitry of a representative computing device. The computing device 400 may include a processor 402 that may be microprocessor or controller for controlling the overall operation of the computing device 400. In one embodiment the processor 402 may be particularly configured to perform the functions described herein relating to deposition of layers of the protective layer assembly. The computing device 400 may also include a memory 404. The memory 404 may include non-transitory and tangible memory that may be, for example, volatile and/or non-volatile memory. The memory 404 may be configured to store information, data, files, applications, instructions or the like. For example, the memory 404 may be configured to buffer input data for processing by the processor 402. Additionally or alternatively, the memory 404 may be configured to store instructions for execution by the processor 402.

The computing device 400 may also include a user interface 406 that allows a user of the computing device 400 to interact with the computing device. For example, the user interface 406 can take a variety of forms, such as a button, keypad, mouse, touch-pad, dial, touch screen, audio input interface, visual/image capture input interface, input in the form of sensor data, and the like. The user interface 406 may also be configured to output information to the user via a display screen, speaker, or other output device. A communication interface 408 may provide for transmitting and receiving data through, for example, a wired or wireless network such as a local area network (LAN), a metropolitan area network (MAN), and/or a wide area network (WAN), for example, the Internet.

The computing device 400 may also include a material deposition module 410. The processor 402 may be embodied as, include or otherwise control the material deposition module 410. The material deposition module 410 may be configured for controlling or executing material deposition operations as discussed herein. Further, the material deposition module may be configured for controlling or executing material deposition operations for the various other layers of the protective layers provided herein.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

Example Implementation Using Sapphire Protective Layers

The relationship between relatively elevated temperatures of computing devices and the expected computer processing speed of those devices is generally well-known and accepted: higher average device temperatures are generally linked to relatively slower computing processing speeds. As the temperature of computing components increases, the internal electrical resistance of those components generally increases, thus slowing computing speeds and requiring relatively more power to complete computing transactions at elevated temperatures than at relatively lower temperatures. In some embodiments of the present disclosure, computing devices with components made from materials with relatively higher thermal transmission properties may have lower average temperatures and longer average battery lives than identical devices made from components with relatively lower thermal transmission properties.

Experiments were conducted on an iPhone® 6 Plus, with iOS version 9.2.1 installed and a fully-charged battery running a continuously-looping high intensity graphics test. First the device was tested with a sapphire protective screen on the device's display until the battery was completely drained. Then the device was tested again on a fully-charged battery running the same continuously-looping high-intensity graphics test using a glass protective screen on the device's display. The device screen's temperature and remaining battery life were recorded at 15-minute intervals for both tests. From these experiments it can be concluded that sapphire protective screens result in cooler phone operating temperatures and longer battery lives than glass protective screens, when all other factors are equal. These experimental results point to a novel approach to extending mobile device battery life by employing sapphire protective screens rather than glass alternatives.

Experiment Details and Data Collection

The device used was in the experiments was an Apple® iPhone® 6 Plus. The testing application included a high-intensity graphics testing application, specifically GFXBench Metal 3.1 by Kishonti Informatics, configured to loop continuously by the application developer. This application is widely used in the consumer electronics industry to measure and benchmark hardware and software performance on mobile or computing electronic devices. A stopwatch application was also running during the experiments. No other applications were being executed during the experiment.

For testing the scenario of a glass protective screen, the InvisibleShield glass protective screen produced by Zagg, Inc. was used. For testing the scenario of a sapphire protective screen, the sapphire screen protector sold by Beslord Corporation (China) was used. The particular sapphire protective screen used for this experiment does not include the edge strengthening layer described above in certain embodiments of the protective layer assembly 104. However, similar results are expected with the protective assembly layer 104 that includes the edge strengthening layer. Similarly, the sapphire protective screen used for this experiment does not include the other features (such as edge bumper layer, functional layer, etc.) described above with respect to certain embodiments of the protective assembly layer 104, however, similar results are expected with the protective assembly layer 104.

The temperature was measured using an infrared non-contact thermometer sold by HDE Corporation, model ST 380A.

For the experiments, the device battery was charged to 100%, with notation of the specific time for when the battery life indicator transitioned from 99% to 100% on the device display. Upon achieving the transition from 99% to 100% battery life on the device display, the device continued to charge for an additional 10 minutes, to "top-off" the battery. After topping-off the battery, a 20-minute "resting period" was conducted, whereby the device was placed in a vertical position on a wooden table, with the device leaning against a ceramic cylinder with a diameter of approximately three inches, a height of approximately four inches, and a cylinder wall thickness of approximately ⅛" such that the device was standing in a "portrait" orientation. Upon completing the 20-minute resting period, the device was placed flat on a vinyl surface with the display side up. Temperature measurements and experiment timing began immediately upon completing the 20 minute resting period and placing the device on the vinyl surface.

The sapphire protective screen was adhered to the device screen per the manufacturer's instructions, prior to charging and topping-off of the device battery. The experiments and data collection were then performed with the sapphire protective screen on the device. Upon completion of the test with the sapphire protective screen, it was removed.

Then the glass protective screen was adhered to the device screen per the manufacturer's instructions, prior to charging and topping-off of the device battery. The experiments and data collection were then performed with the glass protective screen on the phone.

The maximum phone screen temperature and battery life remaining were recorded at initiation of the experiment (after the 20 minute resting period, as described above) and at 15 minute intervals until the phone shut down at the end of its battery life.

Temperature measurements were performed with the non-contact infrared temperature sensor by scanning the entire front surface of the phone screen. The maximum temperature of each scan was measured by the temperature sensor and recorded in a data log. The remaining battery life according to the device display was recorded in the data log. Temperature and battery life measurements continued every 15 minutes until the device shut down from depletion of the battery. Immediately upon shut-down of the phone, the temperature and specific time were recorded, so that the total duration of the battery life for the specific experiment was recorded.

The sequence of experiments was as follows:
Day 1: Sapphire protective screen experiment, Run 1
Day 2: Sapphire protective screen experiment, Run 2
Day 3: Glass protective screen experiment, Run 1
Day 4: Glass protective screen experiment, Run 2

Data for each set of runs were averaged, that is data in Run 1 and Run 2 were averaged for each respective set of tests.

Results

Figure 18:
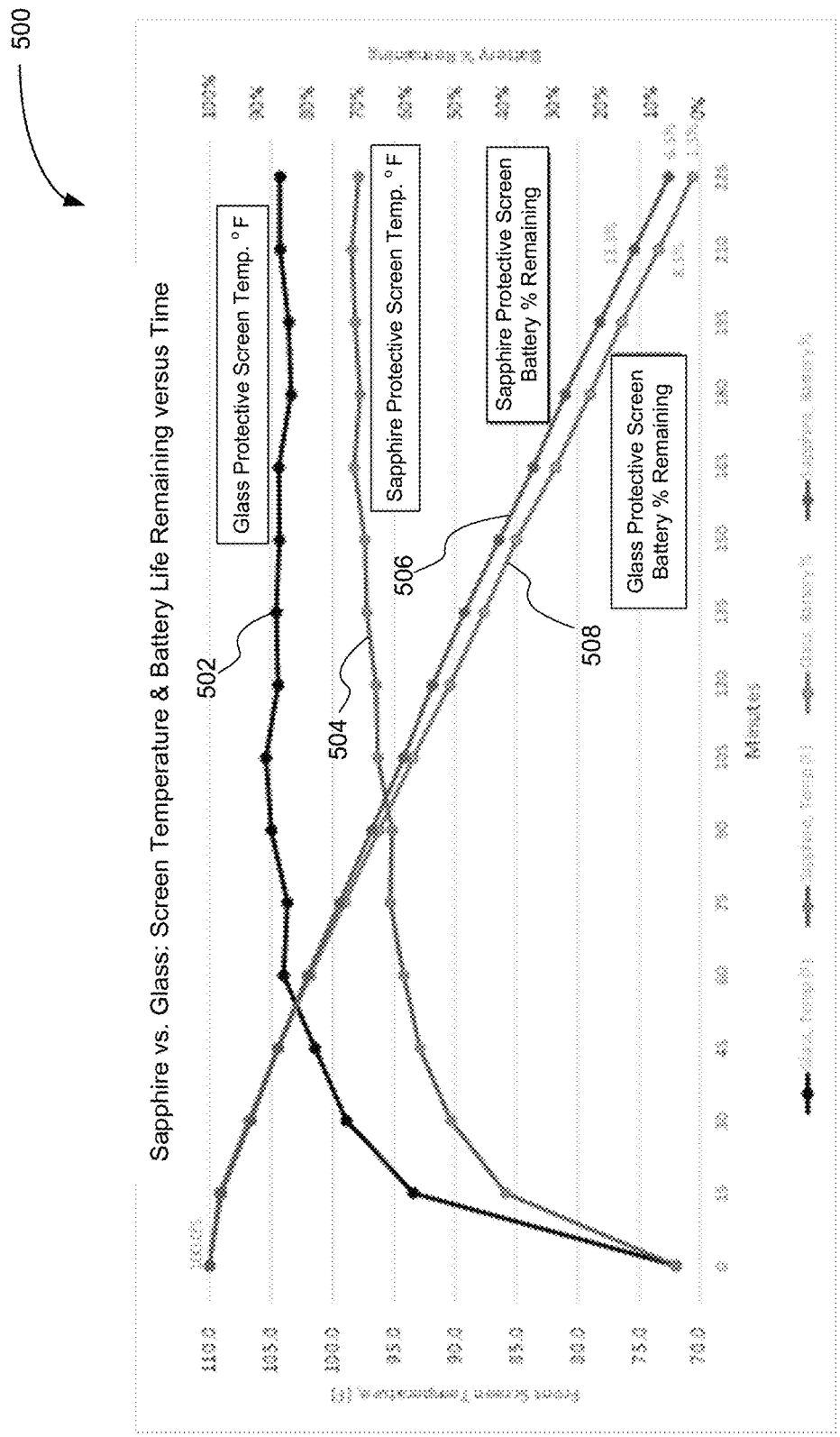
FIG. 18 depicts results of an experiment illustrating the benefits of sapphire versus glass as a screen protector.

As shown in the graph 500 of FIG. 18, the device temperature with the glass protective screen (represented by line 502) was consistently higher than the device temperature with the sapphire protective screen (represented by line 504), with the glass protective screen temperature an average of 7.6° F. higher than the sapphire protective screen. Similarly, the device remaining battery life with the glass protective screen (represented by line 508) was lower over time than the device remaining battery life with the sapphire protective screen (represented by line 506). Furthermore, as shown in Table 1 below, the device battery life with the glass protective screen was an average of approximately 13 minutes shorter than the device battery life with the sapphire protective screen (230.5 minutes battery life with the glass protective screen versus 243.5 minutes with the sapphire protective screen).

TABLE 1

Temperature Data and % Battery Life Remaining Data for Glass Protective Screen versus Sapphire Protective Screen on an iPhone ® 6 Plus.

| | Glass, Run 1 | | Glass, Run 2 | | Avg Glass | | Sapphire, Run 1 | | Sapphire, Run 2 | | Avg Sapphire | | Sapphire |
|---|---|---|---|---|---|---|---|---|---|---|---|---|---|
| Minutes | Glass, Temp (F.) | Glass, Battery % | Glass, Temp (F.) | Glass, Battery % | Glass, Temp (F.) | Glass, Battery % | Sapphire, Temp (F.) | Sapphire, Battery % | Sapphire, Temp (F.) | Sapphire, Battery % | Sapphire, Temp (F.) | Sapphire, Battery % | Temp. vs Glass (F.) |
| 0 | 72.0 | 100% | 72.0 | 100% | 72.0 | 100.0% | 72.0 | 100% | 72.0 | 100% | 72.0 | 100.0% | n/a |
| 15 | 93.9 | 97% | 92.9 | 99% | 93.4 | 98.0% | 85.3 | 98% | 86.4 | 97% | 85.9 | 97.5% | −7.6 |
| 30 | 99.1 | 91% | 98.6 | 93% | 98.9 | 92.0% | 90.9 | 92% | 89.7 | 91% | 90.3 | 91.5% | −8.6 |
| 45 | 100.1 | 85% | 102.7 | 87% | 101.4 | 86.0% | 91.8 | 87% | 93.9 | 85% | 92.9 | 86.0% | −8.6 |
| 60 | 103.2 | 79% | 104.7 | 80% | 104.0 | 79.5% | 94.5 | 81% | 93.9 | 79% | 94.2 | 80.0% | −9.8 |
| 75 | 103.3 | 72% | 104.0 | 73% | 103.7 | 72.5% | 95.8 | 74% | 94.8 | 73% | 95.3 | 73.5% | −8.4 |
| 90 | 105.0 | 65% | 104.9 | 66% | 105.0 | 65.5% | 95.5 | 67% | 94.8 | 67% | 95.2 | 67.0% | −9.8 |
| 105 | 105.3 | 58% | 105.5 | 59% | 105.4 | 58.5% | 96.8 | 61% | 95.8 | 60% | 96.3 | 60.5% | −9.1 |
| 120 | 104.7 | 51% | 104.1 | 51% | 104.4 | 51.0% | 97.3 | 55% | 95.6 | 54% | 96.5 | 54.5% | −8.0 |
| 135 | 104.8 | 44% | 104.3 | 44% | 104.6 | 44.0% | 97.3 | 48% | 97.1 | 48% | 97.2 | 48.0% | −7.4 |
| 150 | 104.9 | 38% | 103.7 | 37% | 104.3 | 37.5% | 97.9 | 41% | 96.8 | 41% | 97.4 | 41.0% | −7.0 |
| 165 | 104.8 | 30% | 103.9 | 29% | 104.4 | 29.5% | 98.5 | 34% | 97.9 | 34% | 98.2 | 34.0% | −6.2 |
| 180 | 103.6 | 23% | 103.1 | 22% | 103.4 | 22.5% | 98.4 | 27% | 97.1 | 28% | 97.8 | 27.5% | −5.6 |
| 195 | 103.5 | 16% | 103.6 | 16% | 103.6 | 16.0% | 99.0 | 20% | 97.3 | 21% | 98.2 | 20.5% | −5.4 |
| 210 | 103.2 | 9% | 105.3 | 8% | 104.3 | 8.5% | 98.9 | 13% | 97.9 | 14% | 98.4 | 13.5% | −5.8 |
| 225 | 104.5 | 2% | 104.0 | 1% | 104.3 | 1.5% | 98.4 | 6% | 97.3 | 7% | 97.9 | 6.5% | −6.4 |
| 240 | XXX | | XXX | | n/a | n/a | 98.2 | 1% | 97.5 | 1% | 97.9 | 1.0% | n/a |
| END | 106.5 | — | 108.1 | — | 107.3 | — | 97.4 | — | 95.2 | — | 96.3 | — | n/a |
| Minutes | 232 | | 229 | | | | 242 | | 245 | | | | Avg: |
| | Avg Minutes of Battery Life: 230.5 | | | | | | Avg Minutes of Battery Life: 243.5 | | | | | | −7.6°F. |

The sapphire protective screen's 13 minutes of "extended" battery time over the glass protective screen's average battery life can translate into significant sapphire extended minutes of device battery life per day, per week, per month, and per year, as illustrated below in Table 2.

TABLE 2

Sapphire "Extended" Minutes per Day, Week, Month, and Year
Sapphire "Extended" Minutes vs. Glass 13.5 minutes per 4 hours
27 minutes per 8 hours
190 minutes per week*
823 minutes per month*
9,881 minutes per year*

*Assuming 8 hours of use per day

From these experiments it can be concluded that sapphire protective screens result in cooler device operating temperatures and longer device battery lives than glass protective screens. Thus there are positive benefits of using sapphire protective screens, including advantageous thermal management properties and extended battery life of computing devices. Therefore, a preferred embodiment of the protective layer assembly described herein includes use of a sapphire layer.

Additionally, sapphire has some fundamental properties that are advantageous for use as a display protector, and in the protective layer assembly described herein, as compared to glass. Sapphire is optically-clear and very durable, making it a good fit for end-uses requiring optical performance & ruggedness. Sapphire for consumer & industrial use is extremely pure and is "water clear" (blue sapphires get their color from impurities). Sapphire is approximately three times harder than glass and sapphire cannot be scratched by quartz, sand, concrete or asphalt, which avoids the most common root causes of glass display failures. Scratches on glass create stress concentration points, often causing glass screen failures when the device is dropped or impacted. Sapphire also has a thermal budget approximately five times greater than glass and is more chemically-resistant than glass, enabling high temperature and/or chemical etching processes for depositing functional layers on sapphire. Furthermore, sapphire has a higher surface energy than glass, which results in water, oils and other liquids beading up higher on sapphire than on glass, thus resulting in sapphire being more smudge-resistant than glass. Sapphire also has a higher dielectric constant than glass, enabling increased touch sensitivity with sapphire.

What is claimed is:

1. A protective layer assembly for a device comprising:
an outer layer that includes sapphire and has a shape conforming to that of a display of the device or a display cover of the device, wherein the outer layer is a separate layer from a display surface of the device and the display cover of the device, and is attachable to the display surface or the display cover of the device;
an adhesive layer disposed to couple the outer layer to the display surface of the device or to the display cover of the device;
a removable protective film affixed to the adhesive layer that is configured to be removable to enable the adhesive layer to couple the outer layer to the display surface of the device or to the display cover of the device; and
a hardened edge strengthening layer permanently attached solely to the outer layer forming a seal of a perimeter of an outer edge of the outer layer as a result of being applied in liquid, paste or spray form directly to the outer edge of the outer layer, the outer edge of the outer layer including side walls connecting a top surface of the outer layer and a bottom surface of the outer layer, wherein the edge strengthening layer is configured to strengthen the outer edge by sealing chips and cracks located in the outer edge.

2. The protective layer assembly of claim 1, wherein the device is a portable computing device having a touch-sensitive display screen.

3. The protective assembly of claim 1, wherein the device is a sensor.

4. The protective assembly of claim 3, wherein the sensor comprises any one of the following biometric sensor, motion-detector sensor, and imaging sensor.

5. The protective layer assembly of claim 1, further comprising:
a functional layer disposed between the outer layer and the adhesive layer.

6. The protective layer assembly of claim 5, wherein the functional layer is made of a thermally conductive material.

7. The protective layer assembly of claim 5, wherein the functional layer is configured to improve magnetic resonance transmission.

8. The protective layer assembly of claim 1, further comprising:
an edge bumper layer disposed around the perimeter of the outer edge of the outer layer adjacent to the edge strengthening layer.

9. The protective layer assembly of claim 1, further comprising:
a luminescent marking made with luminescent ink or luminescent paint disposed on the outer layer such that the luminescent marking is not electrically connected to the device.

10. The protective layer assembly of claim 1, further comprising:
a strengthening layer applied to the outer layer, the strengthening layer comprising at least one of resin, epoxy, or sealing material.

11. The protective layer assembly of claim 1, further comprising:
a strengthening layer applied to the edge strengthening layer, the strengthening layer comprising at least one of resin, epoxy, or sealing material.

12. The protective layer assembly of claim 1, further comprising:
an infrared marking made with infrared ink or infrared paint disposed on the outer layer, such that the infrared marking is not electrically connected to the device.

13. The protective layer assembly of claim 1, wherein the edge strengthening layer is exposed while the protective layer assembly is coupled to the display surface of the device or to the display cover of the device.

* * * * *